(12) United States Patent
Jeon et al.

(10) Patent No.: US 8,908,760 B2
(45) Date of Patent: Dec. 9, 2014

(54) METHOD AND APPARATUS FOR PROCESSING VIDEO SIGNALS

(75) Inventors: Byeong Moon Jeon, Seoul (KR); Joon Young Park, Seoul (KR); Young Hee Choi, Seoul (KR); Seung Wook Park, Seoul (KR); Jung Sun Kim, Seoul (KR); Seung-Won Jung, Seoul (KR); Sung Jea Ko, Seoul (KR); Seung-Jin Baek, Seoul (KR)

(73) Assignees: LG Electronics Inc., Seoul (KR); Korea University Research and Business Foundation, Seoul (KR)

( * ) Notice: Subject to any disclaimer, the term of this patent is extended or adjusted under 35 U.S.C. 154(b) by 694 days.

(21) Appl. No.: 13/262,409

(22) PCT Filed: Mar. 30, 2010

(86) PCT No.: PCT/KR2010/001936
§ 371 (c)(1),
(2), (4) Date: Dec. 15, 2011

(87) PCT Pub. No.: WO2010/114283
PCT Pub. Date: Oct. 7, 2010

(65) Prior Publication Data
US 2012/0093217 A1    Apr. 19, 2012

Related U.S. Application Data

(60) Provisional application No. 61/232,470, filed on Aug. 10, 2009, provisional application No. 61/227,766, (Continued)

(30) Foreign Application Priority Data

Mar. 29, 2010 (KR) .......................... 10-2010-0027980

(51) Int. Cl.
*H04N 7/12* (2006.01)
*H04N 19/583* (2014.01)
(Continued)

(52) U.S. Cl.
CPC ... *H04N 19/00157* (2013.01); *H04N 19/00733* (2013.01); *H04N 19/00909* (2013.01); *H04N* (Continued)

(58) Field of Classification Search
CPC .................. H04N 19/00157; H04N 19/00545; H04N 19/00272; H04N 19/00066; H04N 19/00587; H04N 19/00909; H04N 19/00733
USPC .................. 375/240, 240.01, 240.02, 240.25, 375/240.29
See application file for complete search history.

(56) References Cited

U.S. PATENT DOCUMENTS 6,665,346 B1    12/2003    Lee et al.
7,145,953 B2    12/2006    Park et al.
(Continued)

FOREIGN PATENT DOCUMENTS

EP           1516491 A1      3/2005
KR    10-2000-0012878 A      3/2000
(Continued)

OTHER PUBLICATIONS
PCT International Search Report dated Nov. 12, 2010 for Application No. PCT/KR2010/001936, with English translation, 6 pages.

*Primary Examiner* — Allen Wong
(74) *Attorney, Agent, or Firm* — Fish & Richardson P.C.

(57) ABSTRACT

The present invention relates to a method and apparatus for processing video signals, the method comprising: decoding a current frame of a video signal in block units to generate a restored frame, and acquiring first and second flags to acquire a filter coefficient which is adaptively determined from the video signal for each slice on the basis of flag information, or performing deblocking filtering with a predetermined filter coefficient. The present invention relates to a video signal processing method which includes an inter-frame prediction method that determines a motion vector, and a method for performing inter-frame prediction for a residual image. The method for processing video signals can increase the compression encoding efficiency by performing accurate motion prediction and residual image prediction, and can improve the quality of a restored image by removing distortion and performing a filtering for restoring an image that is close to the original image.

10 Claims, 30 Drawing Sheets

Related U.S. Application Data filed on Jul. 22, 2009, provisional application No. 61/221,085, filed on Jun. 28, 2009, provisional application No. 61/173,608, filed on Apr. 29, 2009, provisional application No. 61/171,076, filed on Apr. 20, 2009, provisional application No. 61/164,475, filed on Mar. 30, 2009.

(51) Int. Cl.
  *H04N 19/86* (2014.01)
  *H04N 19/51* (2014.01)
  *H04N 19/117* (2014.01)
  *H04N 19/46* (2014.01)
  *H04N 19/14* (2014.01)
  *H04N 19/174* (2014.01)

(52) U.S. Cl.
  CPC .............. 19/00587 (2013.01); *H04N 19/00066* (2013.01); *H04N 19/00545* (2013.01); *H04N 19/00272* (2013.01)
  USPC ............. 375/240.02; 375/240.25; 375/240.29

(56) References Cited

U.S. PATENT DOCUMENTS

| 7,251,276 | B2 | 7/2007 | Lee et al. |
| 2003/0219073 | A1 | 11/2003 | Lee et al. |
| 2004/0022315 | A1 | 2/2004 | Park et al. |
| 2008/0159386 | A1 | 7/2008 | Lee et al. |

FOREIGN PATENT DOCUMENTS

| KR | 10-2000-0031028 A | 6/2000 |
| KR | 10-2003-0086076 A | 11/2003 |
| KR | 10-2007-0058839 A | 6/2007 |
| WO | WO 03/094521 A1 | 11/2003 |

FIG. 24

```
slice_header() {
  ......
  iadf_flag
  if (iadf_flag) {
    for (i=0 ; i< 5; i++) { //for each boundary
      iadf_applied[i]
      if (iadf_applied[i]) {
        for (j=0 ; j< NUM_FILTER_COEF ; j++) {
          filter_coef[i][j]
        }
      }
    }
  }
}
```

FIG. 26

```
slice_header() {
  ......
  iadf_flag
  if (iadf_flag) {
    limited_bs_number
    for (i=0 ; j< limited_bs_number ; i++) {
         for (j=0 ; j< NUM_FILTER_COEF ; j++) {
                 filter_coef[i][j]
         }
    }
  }
  .....
}
```

METHOD AND APPARATUS FOR PROCESSING VIDEO SIGNALS

CROSS-REFERENCE TO RELATED APPLICATIONS

This application claims priority to International Application No. PCT/KR2010/001936 filed Mar. 30, 2010, which application claims priority to Korean Application No. 10-2010-0027980, filed Mar. 29, 2010, U.S. Provisional Application No. 61/232,470, filed Aug. 10, 2009, U.S. Provisional Application No. 61/227,766, filed Jul. 22, 2009, U.S. Provisional Application No. 61/221,085, filed Jun. 28, 2009, U.S. Provisional Application No. 61/173,608, filed Apr. 29, 2009, U.S. Provisional Application No. 61/171,076, filed Apr. 20, 2009 and U.S. Provisional Application No. 61/164,475, filed Mar. 30, 2009. The entire contents of each of the above applications are incorporated herein by reference in their entireties.

TECHNICAL FIELD

The present invention relates to a method and apparatus for processing a video signal, and more particularly, to a video signal processing method and apparatus for encoding or decoding a video signal.

BACKGROUND ART

Generally, compression coding means a series of signal processing techniques for transferring digitalized information via a communication circuit or storing digitalized information in a format suitable for a storage medium. Targets of compression coding include audio, video, characters and the like. In particular, a scheme of performing compression coding on a sequence is called video sequence compression. Video sequence is generally characterized in having spatial redundancy and temporal redundancy. And, the compression coding uses a method of eliminating such redundancies.

DISCLOSURE OF THE INVENTION

Technical Problem

However, if the spatial redundancy and the temporal redundancy are not sufficiently eliminated, a compression rate may be lowered in coding a video signal. On the other hand, if the spatial redundancy and the temporal redundancy are excessively eliminated, it is unable to generate information required for decoding a video signal to degrade a decoding rate.

Technical Solution

Accordingly, the present invention is directed to substantially obviate one or more problems due to limitations and disadvantages of the related art. First of all, an object of the present invention is to raise compression coding efficiency of a video signal by accurate motion prediction.

Secondly, another object of the present invention is to raise coding efficiency by performing prediction on a residual value as well as pixel value prediction.

Thirdly, a further object of the present invention is to improve a quality of a reconstructed picture by performing a filtering operation to reconstruct a picture close to an original picture by eliminating distortion generated from picture decoding.

Advantageous Effects

Accordingly, the present invention may provide the following effects and/or advantages.

First of all, in order to obtain a motion vector in inter-picture prediction, a video signal processing method according to the present invention proposes a method of selecting one of a plurality of motion vector predictor candidates effectively or a method of selecting a motion vector, thereby raising coding efficiency by enabling a decoder to obtain a motion vector without encoding an index of a motion vector predictor.

Secondly, a video signal processing method according to the present invention obtains a motion vector predictor in inter-picture prediction more accurately by template matching, thereby raising coding efficiency.

Thirdly, a video signal processing method according to the present invention uses linear interpolation for pixels in a block in a skip mode for a motion vector predictor, thereby obtaining a reconstructed picture having less distortion.

Fourthly, a video signal processing method according to the present invention performs prediction in a residual domain to be suitable for properties of the residual domain, thereby improving coding efficiency.

Fifthly, a video signal processing method according to the present invention performs a deblocking operation using a filtering coefficient optimal for each slice, thereby obtaining a reconstructed picture closer to an original picture.

Sixthly, a video signal processing method according to the present invention performs an adaptive loop filter in a residual domain prior to deblocking filtering to consider quantized noise only, thereby obtaining a reconstructed picture closer to an original picture.

Finally, a video signal processing method according to the present invention applies an adaptive loop filter using a quadtree capable of representing vertical or horizontal rectangular blocks, thereby performing a filtering operation efficiently and improving a quality of a reconstructed picture.

DESCRIPTION OF DRAWINGS

FIG. 24 is a syntax related to a $1^{st}$ embodiment for enabling adaptive filter coefficients to be usable for deblocking filtering.

FIG. 26 is a syntax related to a $2^{nd}$ embodiment for enabling adaptive filter coefficients to be usable for deblocking filtering.

BEST MODE FOR INVENTION

To achieve these and other advantages and in accordance with the purpose of the present invention, as embodied and broadly described, the present invention.

To further achieve these and other advantages and in accordance with the purpose of the present invention, a method of processing a video signal according to the present invention may include the steps of receiving the video signal, generating a reconstructed frame by decoding a current frame in the video signal by a block unit, obtaining a $1^{st}$ flag indicating whether to perform a deblocking filtering using a $1^{st}$ filter coefficient or a $2^{nd}$ filter coefficient on the reconstructed frame, and if the $1^{st}$ flag indicates to use the $1^{st}$ filter coefficient, obtaining the $1^{st}$ filter coefficient from the video signal, performing the deblocking filtering using the obtained $1^{st}$ filter coefficient, if the $1^{st}$ flag indicates to use the $2^{nd}$ filter coefficient, performing the deblocking filtering using the $2^{nd}$ filter coefficient, wherein the $1^{st}$ filter coefficient indicates a value adaptively determined per slice, wherein the slice is included in the current frame, and wherein the $2^{nd}$ filer coefficient indicates a value derived from a predetermined table information.

Preferably, the method may further include the step of deriving a block boundary strength based on a position of a current pixel in the current frame, wherein the deblocking filtering performing step is performed using the $1^{st}$ or $2^{nd}$ filter coefficient corresponding to the derived block boundary strength.

Preferably, the $1^{st}$ filter coefficient is selected to minimize an average squared error between a value of an original frame and a value of the reconstructed frame.

BEST MODE FOR INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

In particular, it is understood that coding in the present invention should conceptionally include both encoding and decoding.

Figure 1:
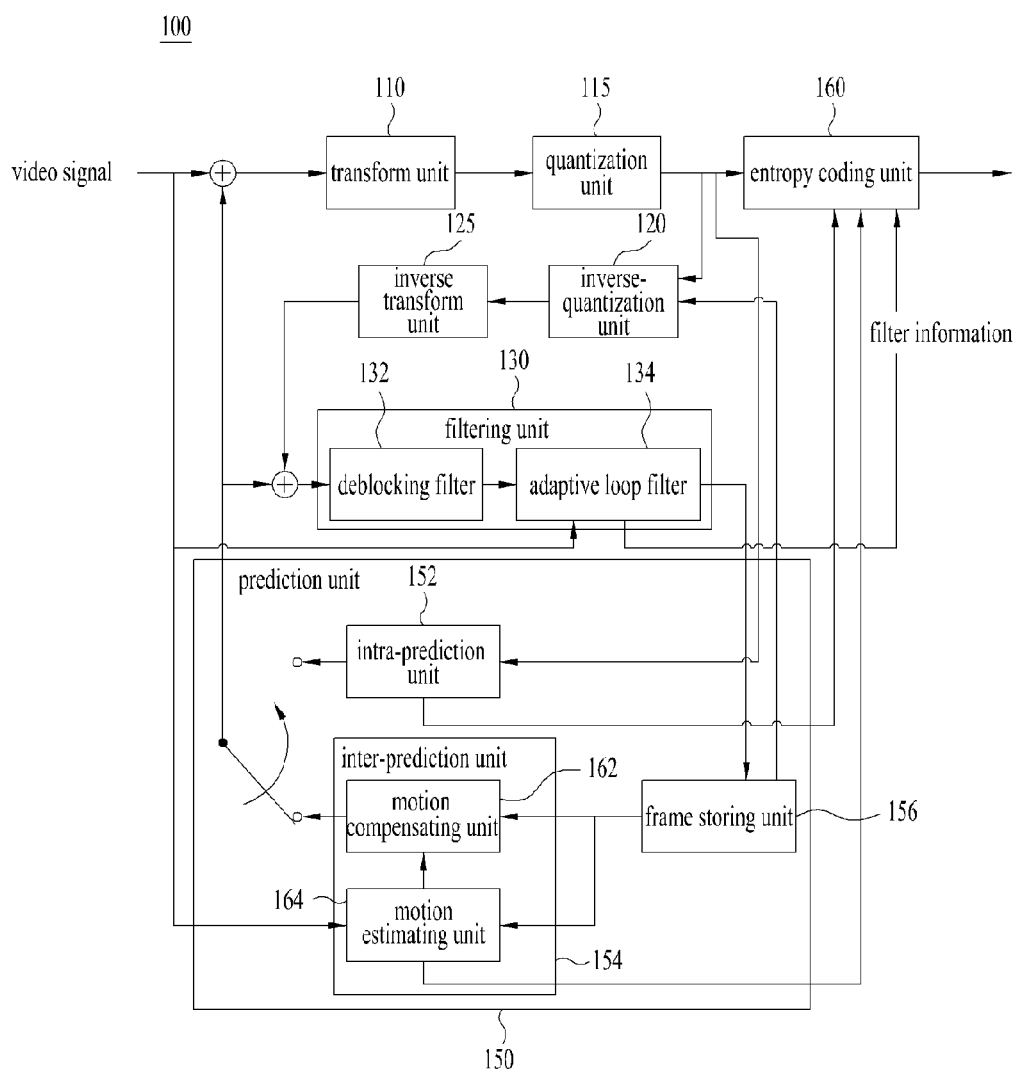
FIG. 1 is a schematic block diagram of a video signal encoding apparatus according to one embodiment of the present invention.

FIG. 1 is a schematic block diagram of an apparatus for encoding a video signal according to one embodiment of the present invention. Referring to FIG. 1, a video signal encoding apparatus 100 according to the present invention may include a transform unit 110, a quantization unit 115, a inverse-quantization unit 120, an inverse transform unit 125, a filtering unit 130, a prediction unit 150 and an entropy coding unit 160.

The transform unit 110 transforms a pixel value for an inputted video signal and then obtains a transform coefficient value. For instance, one of DCT (discrete cosine transform), wavelet transform and the like may be usable. In particular, the discrete cosine transform may perform the transform in a manner of dividing the inputted video signal by block unit. The quantization unit 115 quantizes the transform coefficient value outputted from the transform unit 110. The inverse-quantization unit 120 inverse-quantizes the transform coefficient value and the inverse transform unit 125 reconstructs an original pixel value using the inverse-quantized transform coefficient value.

The filtering unit 130 performs a filtering operation for the quality improvement of a reconstructed picture. For instance, the filtering unit 130 may include a deblocking filter 132, an adaptive loop filter 134 and the like. In case of transforming a picture by block unit, a distortion effect (hereinafter named 'block distortion') may be generated from a block boundary. In order to reduce such block distortion, the deblocking filter 132 may be applicable. The deblocking filter 132 may improve a quality of a reconstructed picture by smoothening block edges. Although the deblocking filtering may be evenly performed on a whole picture, it may be effectively performed by adjusting filtering strength attributed to boundary strength and a gradient of an image sample around a boundary. A detailed method of applying the deblocking filter 132 according to the present invention may be described again with reference to FIGS. 22 to 27 later.

Moreover, it may be apply the adaptive loop filter 134 to remove noise from a whole picture. A method of applying the adaptive loop filter 134 according to the present invention may be described in detail with reference to FIGS. 29 to 35 later.

The picture through filtering may be outputted or may be saved in a frame storing unit 156 to be used as a reference picture.

It may be able to use a method of obtaining a reconstructed picture as follows. First of all, in order to raise coding efficiency, a picture is predicted using a previously coded region. Secondly, a residual value between an original picture and the predicted picture is added to the predicted picture to obtain a decoded image. The intra-prediction unit 152 performs inter-picture prediction within a current picture. And, the inter-prediction unit 154 predicts the current picture using a reference picture stored in a frame storing unit 156.

The intra-prediction unit 152 performs intra-picture prediction from the decoded regions within the current picture and delivers intra-picture coding information to the entropy coding unit 160. Although the intra-picture prediction is performed on a reconstructed picture in general, it may be able to perform the intra-picture prediction on a residual picture according to an embodiment of the present invention. This may be described with reference to FIGS. 16 to 21 later.

The inter-prediction unit 154 may include a motion compensating unit 162 and a motion estimating unit 164. The motion estimating unit 164 obtains a motion vector of a current frame by referring to a decoded frame. A method of determining a motion vector in the motion estimating unit 164 according to the embodiment of the present invention may be described with reference to FIGS. 3 to 15 later. The motion estimating unit 164 delivers position information (e.g., reference frame, motion vector, etc.) of a reference block and the like to the entropy coding unit 160 to enable the delivered position information to be contained in a bitstream. The motion compensating unit 162 performs inter-picture motion compensation using the motion vector delivered from the motion estimating unit 164.

The entropy coding unit 160 generates a video signal bitstream by performing entropy coding on a quantized transform coefficient value, intra-picture coding information, inter-picture coding information, reference block information inputted from the inter-prediction unit 154 and the like. In this case, the entropy coding unit 160 may be able to use a variable length coding (VLC) scheme and an arithmetic coding scheme. The variable length coding (VLC) scheme transforms inputted symbols into contiguous codeword. And, a length of the codeword may be variable. For instance, frequently generated symbols may be represented as a short codeword, whereas non-frequently generated symbols. may be represented as a long codeword. A context-based adaptive variable length coding (CAVLC) scheme may be usable as a variable length coding scheme. The arithmetic coding scheme transforms contiguous data symbols into a single prime number. And, the arithmetic coding scheme may be able to obtain an optimal prime bit required for representing each symbol. A context-based adaptive binary arithmetic code (CABAC) may be usable as the arithmetic coding scheme.

Figure 2:
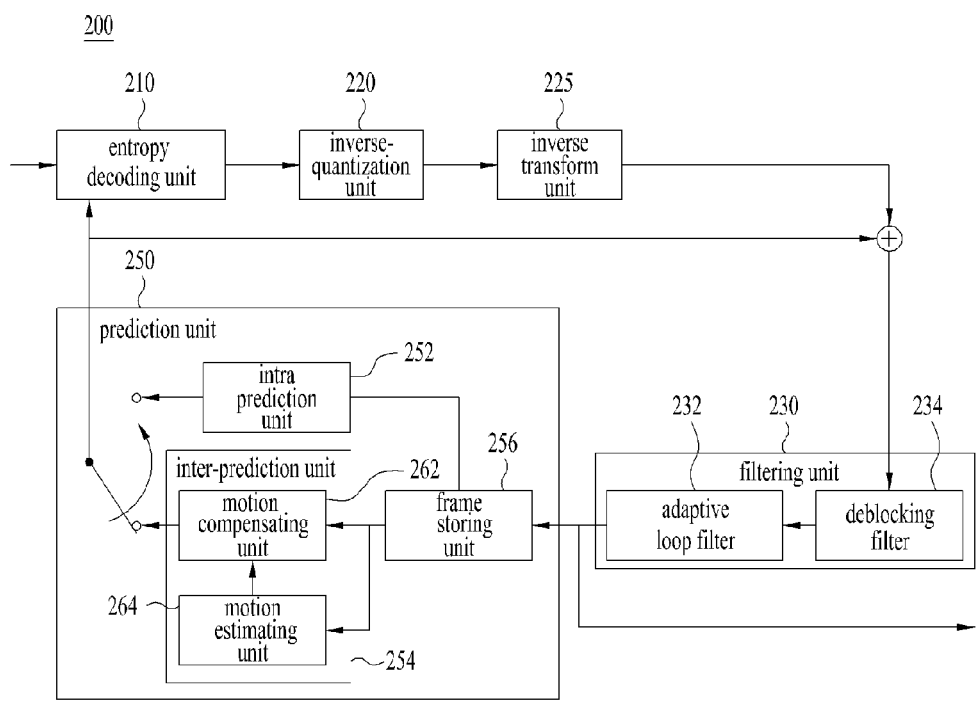
FIG. 2 is a schematic block diagram of a video signal decoding apparatus according to one embodiment of the present invention.

FIG. 2 is a schematic block diagram of a video signal decoding apparatus 200 according to one embodiment of the present invention. Referring to FIG. 2, a video signal decoding apparatus 200 according to one embodiment of the present invention may include an entropy decoding unit 210, a inverse-quantization unit 220, an inverse transform unit 225, a filtering unit 230 and a prediction unit 250.

The entropy decoding unit 210 entropy-decodes a video signal bitstream and then extracts a transform coefficient of each macroblock, motion vector information and the like. The inverse-quantization unit 220 inverse-quantizes an entropy-decoded transform coefficient, and the inverse transform unit 225 reconstructs an original pixel value using the inverse-quantized transform coefficient. Meanwhile, the filtering unit 230 improves an image quality by performing filtering on a picture. In this case, a deblocking filter 234 for reducing block distortion effect, an adaptive loop filter 232 for eliminating distortion of a whole picture and the like may be further included in the filtering unit 230. The filtered picture may be outputted or saved in a frame storing unit 256 to be used as a reference picture for a current frame.

The intra-prediction unit 252 may perform intra-picture prediction from a decoded sample within a current picture. Operations of the intra-prediction unit 252 of the decoder may be identical to those of the former intra-prediction unit 152 of the above-mentioned encoder. And, the intra-prediction unit 252 may perform intra-picture prediction for a residual value in some of the embodiments of the present invention. This may be described with reference to FIGS. 16 to 21 later.

The inter-prediction unit 254 may estimate a motion vector using the reference pictures stored in the frame storing unit 256 and then generated a predicted picture. The inter-prediction unit 254 may include a motion compensating unit 262 and a motion estimating unit 264. The motion estimating unit 264 obtains a motion vector, which indicates a relation between a current block and a reference block of a reference frame used for coding, and then delivers the obtained motion vector to the motion compensating unit 262. Operations of the inter-prediction unit 254 of the decoder may be identical to those of the former inter-prediction unit 154 of the above-mentioned encoder. And, a method of determining a motion vector in the motion estimating unit 264 according to an embodiment of the present invention may be described with reference to FIGS. 3 to 15 later.

The prediction value outputted from the intra-prediction unit 252 or the inter-prediction unit 254 may be added to the residual value outputted from the inverse transform unit 225 to generate a reconstructed video frame.

In the following description, in the operations of the encoding/decoding apparatus, a method of predicting a motion vector in the inter-prediction units 154/254 may be described in detail with reference to FIGS. 3 to 15, a method of predicting a residual picture in the intra-prediction unit 152/252 may be described in detail with reference to FIGS. 16 to 21, and a method of improving a filtering performance in the filtering unit 130/230 may be described in detail with reference to FIGS. 22 to 27.

According to one embodiment of the present invention, the inter-prediction unit 154/254 may be able to obtain a motion vector in a manner of obtaining at least one or more motion vector predictors, selecting one of the at least one or more motion vector predictors, and then adding a difference between an original motion vector and the motion vector predictor to the selected motion vector predictor. In the following description, various methods for obtaining motion vector predictor candidates and a method of selecting one of them may be explained.

Figure 3:
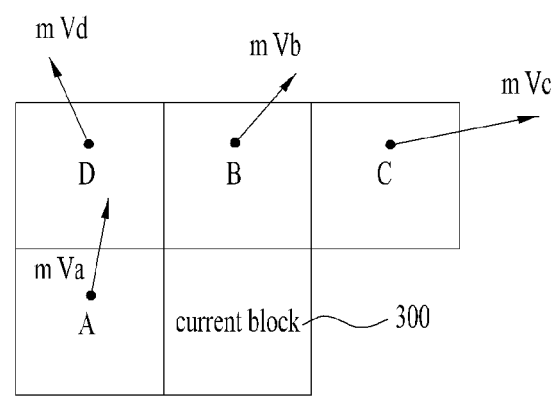
FIG. 3 is a diagram of blocks spatially associated with a current block used to obtain a motion vector predictor.
Figure 4:
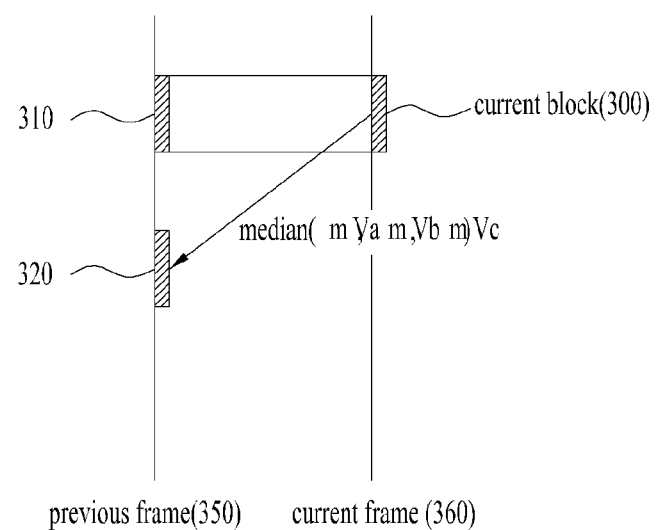
FIG. 4 is a diagram of blocks temporally associated with a current block used to obtain a motion vector predictor.

FIG. 3 is a diagram of blocks spatially associated with a current block used to obtain a motion vector predictor. And, FIG. 4 is a diagram of blocks temporally associated with a current block used to obtain a motion vector predictor. In this case, the associated block may mean a block having high possibility in having a similar motion vector.

Referring to FIG. 3, which shows spatially associated blocks, a left side A, a top side B, a right top side C and a left top side D of a current block 300 may include blocks spatially associated with the current block 300, respectively. Assuming that motion vectors of the associated blocks are set to $mv_a$, $mv_b$, $mv_c$ and $mv_d$, respectively, they may become motion vector predictor candidates of the current block. And, a median or average of horizontal and vertical components of each of the $mv_a$, $mv_b$ and $mv_c$ may become another candidate. If all of the $mv_a$, $mv_b$ and $mv_c$ are usable, it may be able to use a median of the 3 values. Otherwise, when the $mv_a$ is usable, it may be able to use the $mv_a$. Otherwise, when the $mv_b$ is usable, it may be able to use the $mv_b$. Otherwise, when the $mv_c$ is usable, it may be able to use the $mv_c$. If all of the $mv_a$, $mv_b$ and $mv_c$ are not usable, it may be able to use 0.

Referring to FIG. 4, which shows a temporally associated block, the temporally associated block may include a block 310 at the same position in a previous frame or a reference block 320 indicated by a motion vector found via a median of motion vectors of reconstructed neighbor blocks. The reconstructed neighbor blocks may include a block on a top side, a block on a left side, a block on a right top side and the like, by which the reconstructed neighbor blocks may be non-limited. A motion vector of the block 310 at the same position or a motion vector of the reference block 320 may become another candidate for a motion vector predictor of a current block. Alternatively, a median of the above-described motion vector predictors may become a further candidate. And, a method of determining a candidate for a motion vector predictor may be non-limited by the methods described in this specification.

Meanwhile, it may be able to obtain information indicating the number of candidates for a motion vector predictor used for coding or information indicating what kind of candidates are used from a received video signal. Through this information, it may be able to recognize that candidates for which motion vector predictor are used for encoding. And, the same scheme may be applicable to decoding.

According to some of the embodiments of the present invention, an index of a selected motion vector predictor may be contained in a video signal by being directly coded.

According to another embodiment of the present invention, in order to decrease the number of bits required for coding an index in direct, it may be able to select a motion vector by applying a motion vector predictor selecting method of the same scheme to an encoder and a decoder both instead of coding an index. For instance, it may be able to select a most similar motion vector predictor using a measured value for calculating an extent of similarity to an original motion vector. In the following description, for example of the measured value of the extent of the similarity, a method of finding a side match error may be explained with reference to FIGS. 5 to 8.

Figure 5:
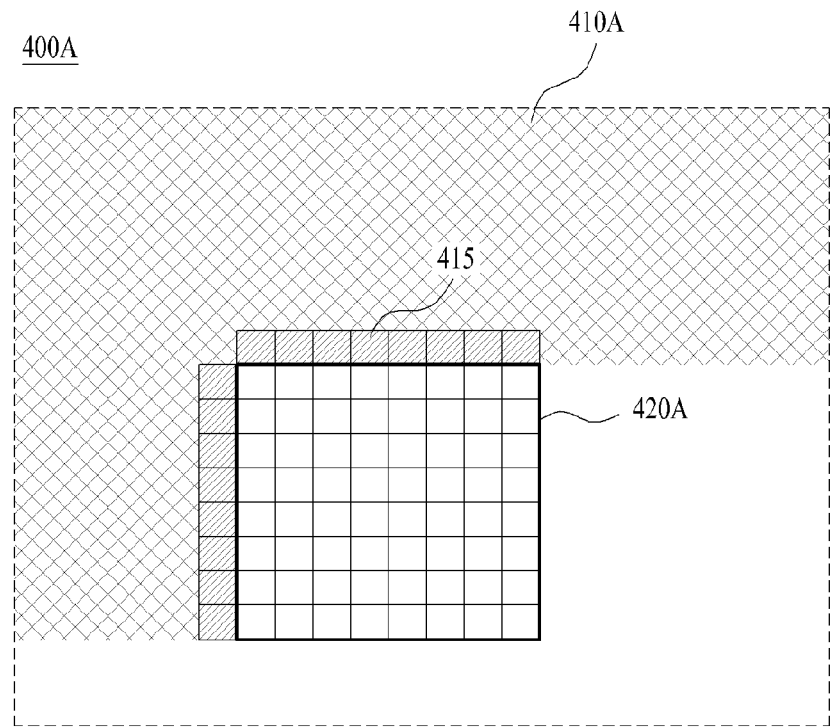
FIG. 5 is a diagram of an outer edge region of a current block in a current frame used to find a side match error (SME).
Figure 6:
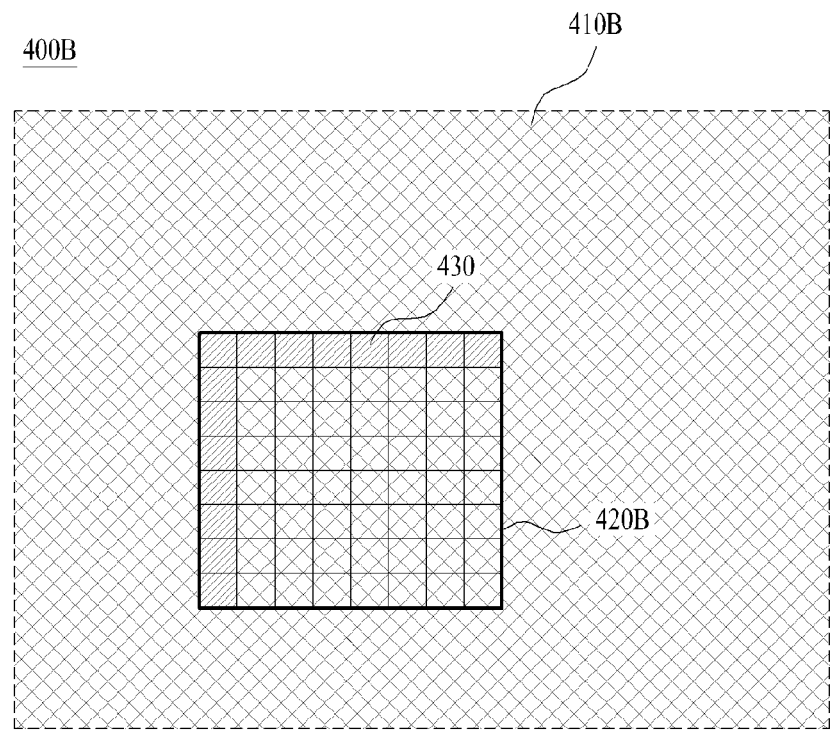
FIG. 6 is a diagram of an inner edge region of a reference block in a reference frame used to find a side match error.
Figure 7:
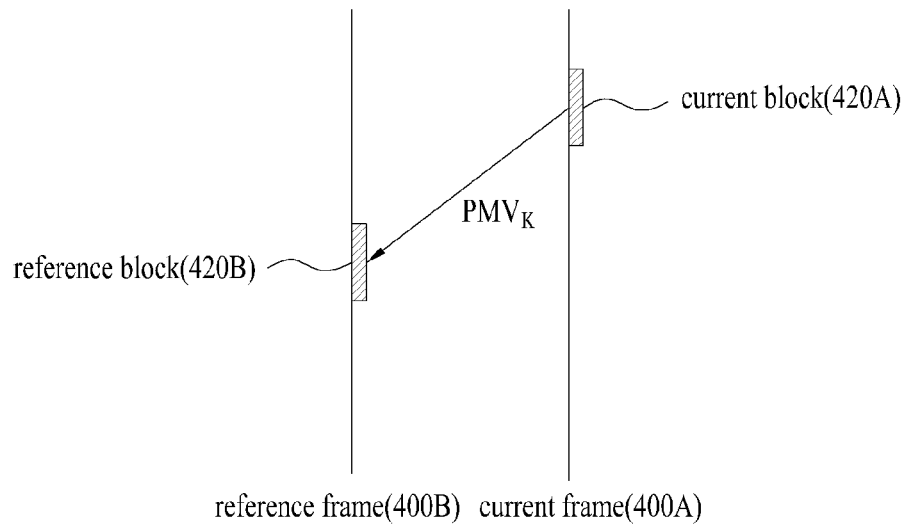
FIG. 7 is a diagram of a $1^{st}$ embodiment for a relation between a current block and a reference block used to find a side match error.
Figure 8:
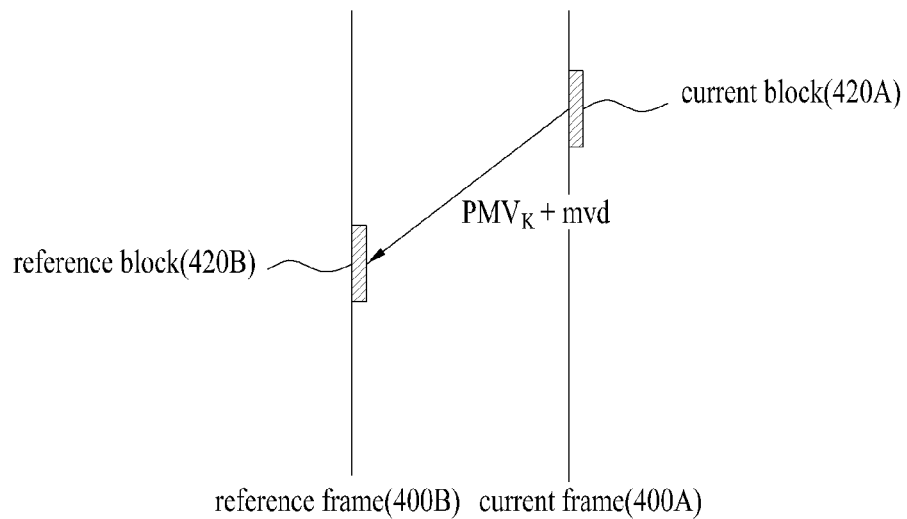
FIG. 8 is a diagram of a $2^{nd}$ embodiment for a relation between a current block and a reference block used to find a side match error.

FIG. 5 shows a current frame 400A in which a current block 420A is located. And, FIG. 6 shows a reference frame 400B previously reconstructed. FIG. 7 and FIG. 8 are diagrams of embodiments for in a relation between a current block 420A and a reference block 420B used to find a side match error. Referring to FIG. 7, a reference block 420B may be the block indicated by a motion vector predictor PMV of the current block 420A in a reference frame 400B. Optionally, referring to FIG. 8, a reference block 420B may be the block indicated by a value resulting from adding a motion vector difference mvd to a motion vector predictor PMV, i.e., a motion vector.

In order to find a side match error, an already-reconstructed region 410A in a current frame 400A may be used in part. Since coding is performed in top-to-bottom or left-to-right direction, top and right side regions adjacent to the current block 420A, i.e., an outer edge region 415 may be usable to find a side match error. Hence, a sum of pixel difference between the too and left side edge region 430 within the reference block and the outer edge region of the current block may become a side match error.

Assume that candidates for n motion vector predictors for a current block may be set to $PMV_1, PMV_2, \ldots, PMV_n$, respectively. The candidates may include at least one of the various motion vector predictors explained in the foregoing description. The above-described side match error may be found for the candidates for all the motion vector predictors.

According to one embodiment of the present invention described with reference to FIG. 7, a side match error for a $k^{th}$ motion vector predictor $PMV_K$ may be found by Formula 1.

$$SME_k = \sum_{i=x}^{x+N-1} \left| \hat{f}_{ref}(i + PMV_{kx}, y + PMV_{ky}) - \hat{f}_n(i-1, y) \right| + \sum_{j=y}^{y+N-1} \left| \hat{f}_{ref}(x + PMV_{kx}, j + PMV_{ky}) - \hat{f}_n(x, j-1) \right| \quad \text{[Formula 1]}$$

In Formula 1, $\hat{f}_n$ may indicate a reconstructed current frame, $\hat{f}_{ref}$ may indicate a reconstructed reference frame, and $PMV_{kx}$ and $PMV_{ky}$ may indicate x and y values of the vector $PMV_k$, respectively.

According to another embodiment of the present invention described with reference to FIG. 8, a side match error for a $k^{th}$ motion vector predictor $PMV_K$ may be found by Formula 2.

$$SME_k = \sum_{i=x}^{x+N-1} \left| \hat{f}_{ref}(i + PMV_{kx} + mvd_x, y + PMV_{ky} + mvd_y) - \hat{f}_n(i-1, y) \right| + \sum_{j=y}^{y+N-1} \left| \hat{f}_{ref}(x + PMV_{kx} + mvd_x, j + PMV_{ky} + mvd_y) - \hat{f}_n(x, j-1) \right| \quad \text{[Formula 2]}$$

A motion vector predictor having a smallest value among side match error values for the motion vector predictors, as shown in Formula 3, may be selected as a final motion vector predictor.

$$PMV_{best} = \underset{PMV_k}{\operatorname{argmin}} SME_k \qquad \text{[Formula 3]}$$

According to another embodiment of the present invention, as a method of measuring an extent of similarity between a motion vector predictor and an original motion vector, it may be base to use one of a sum of squared error (SSE), a sum of pixel value difference by enabling the same value over a predetermined value [truncated SAD], a sum of truncated squared error [truncated SS], variation difference of pixel value (i.e., slope) and the like as well as a sum of pixel value difference between the outer edge region 415 of the current block and the edge region 430 within the reference block [sum of absolute difference (SAD)].

Figure 9:
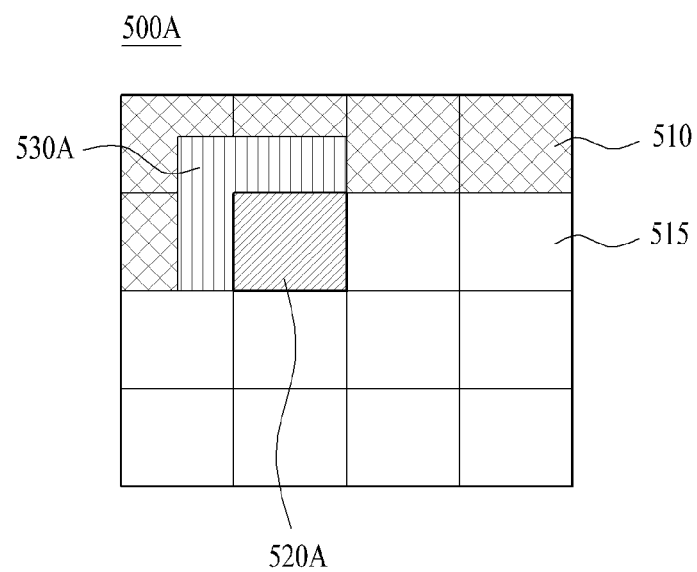
FIG. 9 is a diagram of a target region and a template region in a current frame to perform template matching.
Figure 10:
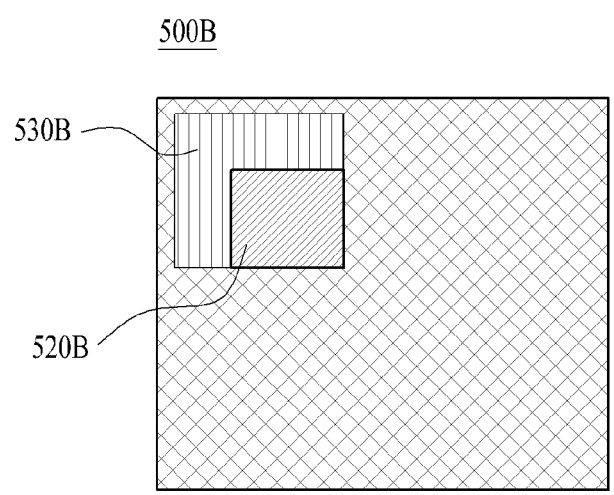
FIG. 10 is a diagram of a template region matched in a reference frame on which template matching is performed.

According to some of embodiments of the present invention, in order to find a motion vector predictor, it may be able to use template matching. FIG. 9 shows a current frame 500A including a current block 520A. And, FIG. 10 shows a reference frame 500B. In the following description, template matching may be explained with reference to FIG. 9 and FIG. 10.

First of all, a target region is a current block 520A to be predicted using template matching. A template may mean a region to be found in a reference frame 500B and should be an already reconstructed region to be used as the template. Referring to FIG. 9, in a coding process for the current frame 500A, the current frame may be divided into a reconstructed region 510 and a previous region 515 before the reconstruction. Moreover, the current block 520A to be coded is not reconstructed yet as well. According to one embodiment of the present invention, a template region 530A may include pixels adjacent to left and top side edges of the target region with predetermined space. The reference frame 500 may be searched for a region 530B similar to the template region 530A of the current frame. After a motion vector of the region 520B corresponding to a target block around the template-similar region 530B in the reference frame has been obtained, it may be used as a motion vector predictor of the target block 520A.

Using the template matching may provide prediction performance better than that of brining a motion vector of neighbor block simply. Therefore, coding efficiency may be raised by decreasing the number of bits of a motion vector residual.

Figure 11:
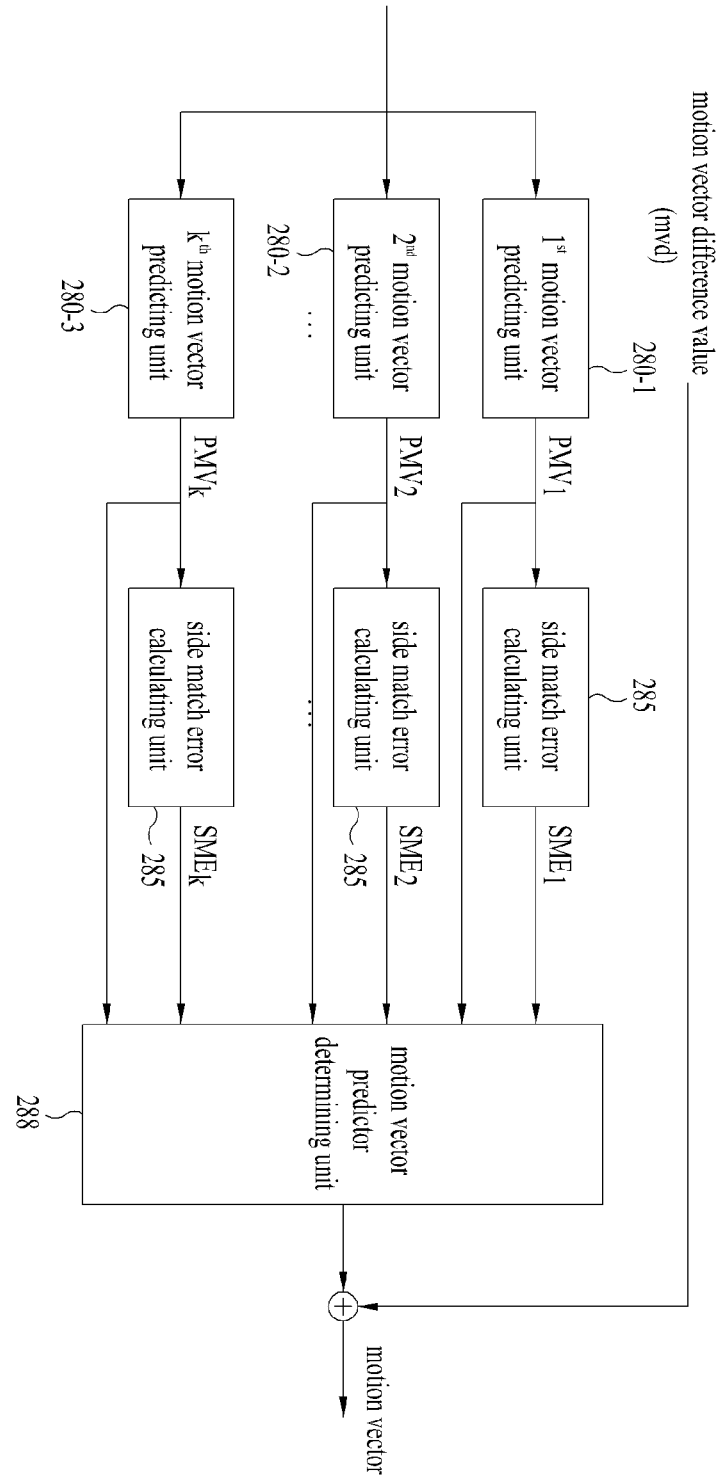
FIG. 11 is a block diagram of a process for selecting a motion vector predictor from a plurality of motion vector predictor candidates by calculating a side match error within a motion estimating unit according to one embodiment.

FIG. 11 is a block diagram of a process for obtaining a motion vector in a manner of selecting a motion vector predictor by calculating side match errors of a plurality of motion vector predictor candidates in the motion estimating unit 264. First of all, k motion vector predicting units 280-1 to 280-3 generate candidates for a motion vector predictor in different manners, respectively. The candidates for the motion vector predictor are delivered to side match error calculating units 285 to calculate side match error values, respectively. The calculated side match error values are entirely delivered to a motion vector predictor determining unit 288. And, the motion vector predictor having a smallest value among the delivered side match error values may be then selected as a finial motion vector predictor. Thereafter, a motion vector may be generated by adding a motion vector difference value to the final motion vector predictor.

Figure 12:
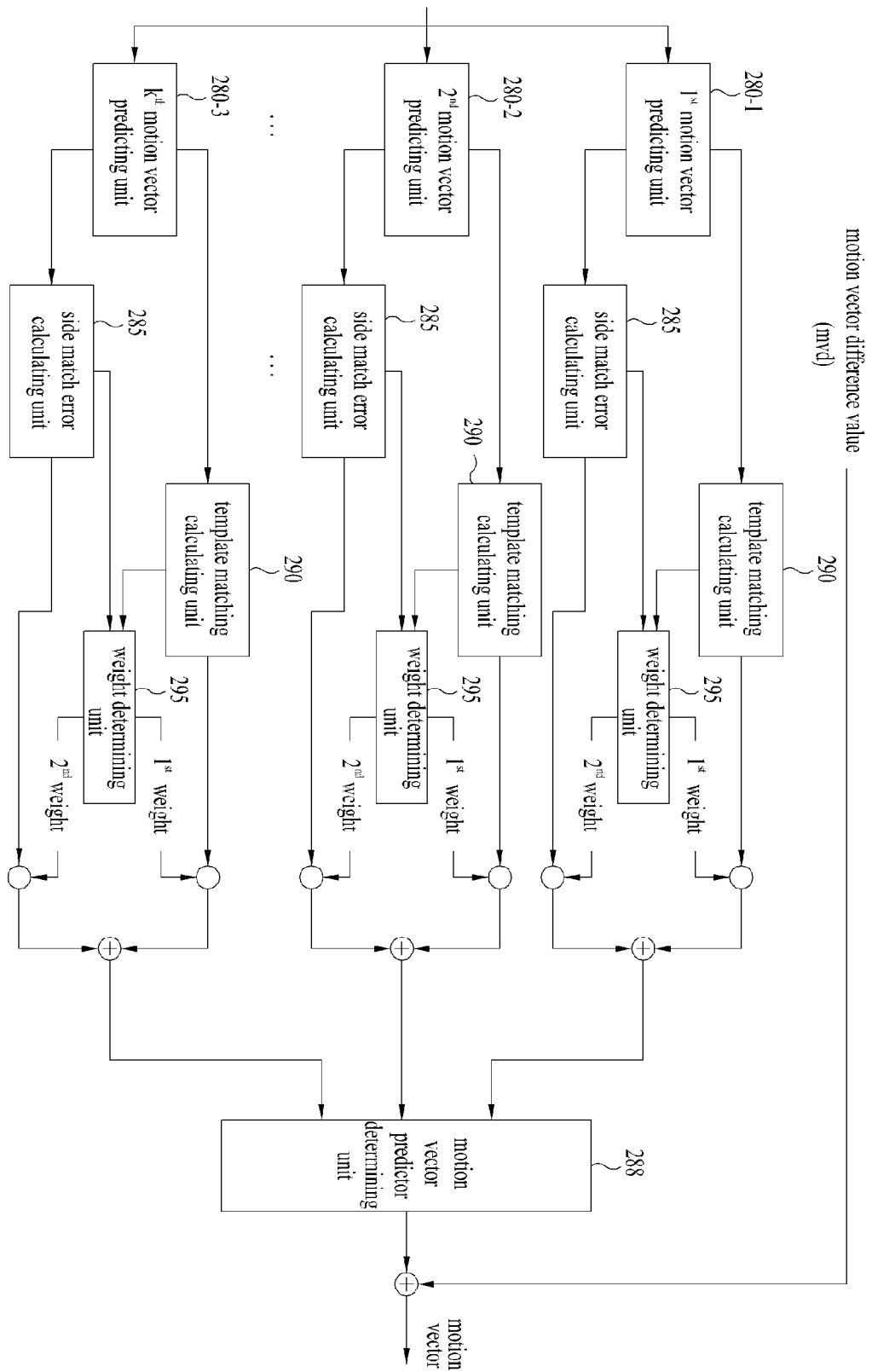
FIG. 12 is a block diagram for a method of using both a side match error using method and a template matching using method simultaneously in determining a motion vector predictor within a motion estimating unit according to one embodiment.

FIG. 12 shows a method of using both a side match error using method and a template matching using method simultaneously in determining a motion vector predictor within the motion estimating unit 264 according to one embodiment. First of all, k motion vector predicting units 280-1 to 280-3 generate candidates for a motion vector predictor in different manners, respectively. The candidates for the motion vector predictor are delivered to side match error calculating units 285 and template matching calculating units 290 to calculate side match error values and template matching values, respectively. The calculated side matching error value and the calculated template matching value are linearly combined together using a weight determined by a weight determining unit 295 and are then delivered to a motion vector predictor determining unit 288. The motion vector predictor determining unit 288 selects a optimal motion vector predictor based on the delivered linear combination values.

The weight determining value 295 may be able to generate a $1^{st}$ weight and a $2^{nd}$ weight to maintain a constant reflection rate per pixel in consideration of the number of pixels used for an operation. It may be more advantageous in placing more relative importance on the side matching method than the template matching method, by which this embodiment may be non-limited. Alternatively, weights may be generated in various ways.

Meanwhile, according to another example of the present invention, it may be able to determine a motion vector value in direct without generating a motion vector predictor. In this case, it may be unnecessary to encode a motion vector difference value.

Figure 13:
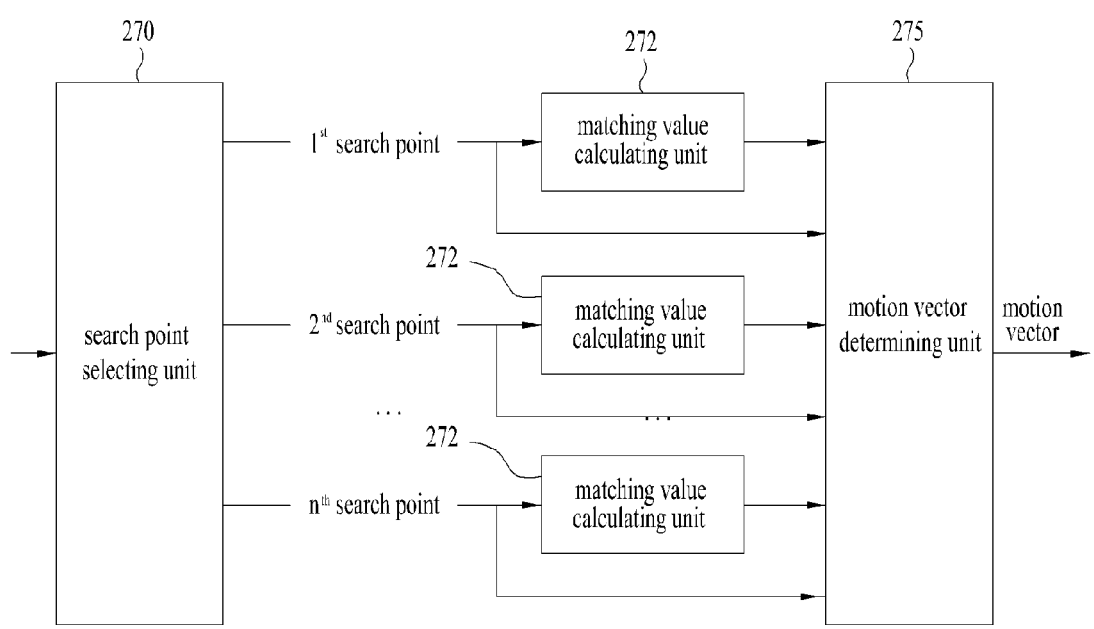
FIG. 13 is a block diagram for a method of determining a motion vector within a motion estimating unit according to one embodiment.

FIG. 13 is a block diagram for a method of determining a motion vector within a motion estimating unit 264 according to one embodiment. Referring to FIG. 13, a search point selecting unit 270 selects a plurality of regions as motion vector candidates. For each of a plurality of the selected search points, a corresponding matching value calculating unit 272 calculates a matching value that indicates an extent of similarity between a reference block and a current block. According to some of embodiments of the present invention, the matching value calculating unit 272 may use the above-mentioned side match error measuring method or the above-mentioned template matching error measuring method.

The side match error may indicate an error between an outer edge region 415 adjacent to a current block and an inner edge region 430 of a reference block in a reference frame 400B [refer to FIG. 5 and FIG. 6].

The template matching error may indicate an error between an outer edge region 530A adjacent to a current block and a corresponding region 530B in a reference frame 500B [refer to FIG. 9 and FIG. 10].

The measurement of the error value may be able to use a sum of pixel value difference [sum of absolute difference (SAD)], a sum of squared error (SSE), a sum of pixel value difference by enabling the same value over a predetermined value [truncated SAD], a sum of truncated squared error [truncated SS], a slope and the like.

Figure 14:
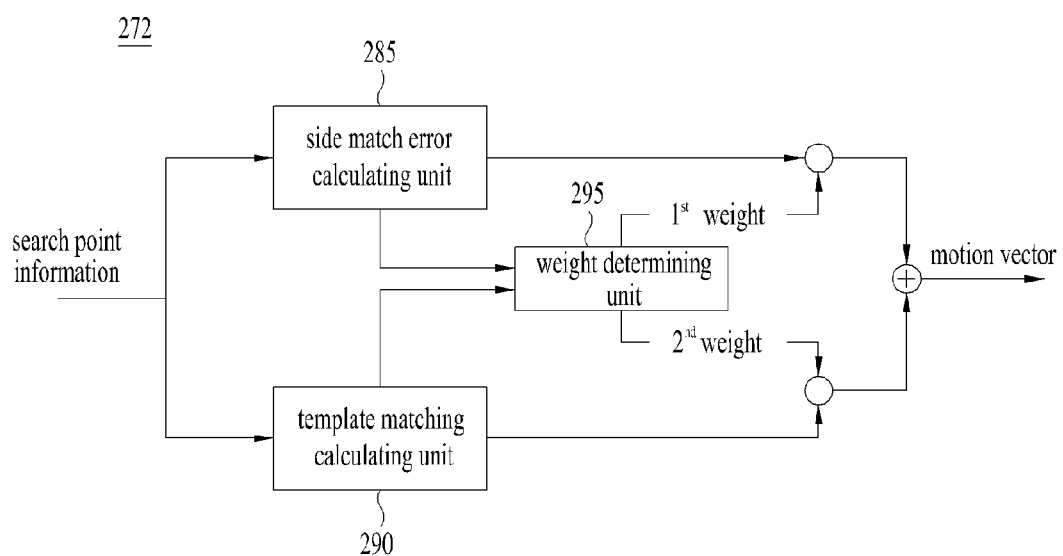
FIG. 14 is a block diagram for a method of using a side match error and a template matching error simultaneously to determine a motion vector within a motion estimating unit according to one embodiment.

According to another embodiment of the present invention, it may be able to simultaneously use both a side match error measuring method and a template matching error measuring method. FIG. 14 is a block diagram for a method of using a side match error and a template matching error simultaneously in a matching value calculating unit 272. For inputted search point information, a side match error calculating unit 285 calculates the above-mentioned side match error value and a template matching calculating unit 290 calculates the above-mentioned template matching error value. The error values are linearly combined with $1^{st}$ and $2^{nd}$ weights determined by a weight determining unit 295, respectively, to generate a new matching error. As mentioned in the foregoing description, the weight determining unit 295 may be able to generate a suitable weigh using the pixel information and the like used by the side match error calculating unit 285 and the template matching calculating unit. The new matching error is delivered to a motion vector determining unit 275 to be used in determining an optimal motion vector.

Skip mode may be defined as a scheme of using an intact pixel value of a block in a previously coded reference picture without information on a current block (i.e., a motion vector, a reference picture index, a residual data between an original picture and a reconstructed picture, etc.). In coding a skip block, it may be accompanied by motion compensation using a motion vector. In this case, the motion vector may be derived using a neighbor block.

Figure 15:
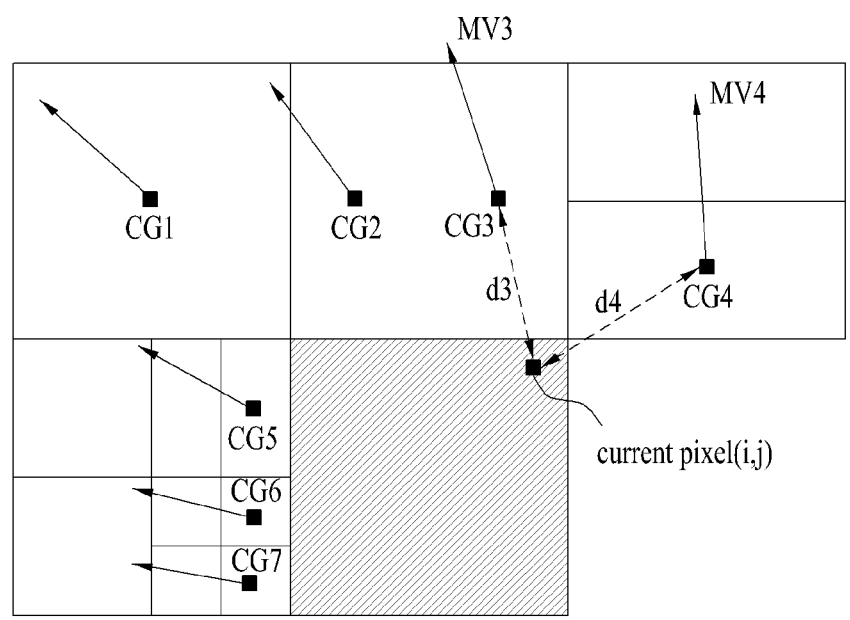
FIG. 15 is a diagram for a motion vector predicting method in control grids of neighbor blocks and a current pixel according to one embodiment of the present invention.

According to one embodiment of the present invention, a motion vector may be derived by pixel unit using a control grid. FIG. 15 is a diagram for a motion vector predicting method in control grids of neighbor blocks and a current pixel according to one embodiment of the present invention. A control grid is a value that represents a position of a block. Referring to FIG. 15, a control grid may become a block center position. Alternatively, a control grid may correspond to one of 4 apexes of a block. Using motion vector values of two control grids close to a current pixel, it may be able to calculate a motion vector value of the current pixel by bilinear interpolation. In particular, a motion vector of a current pixel (i, j) may be found by Formula 4.

$$MV_{i,j} = \frac{(d_p \times MV_q + d_q \times MV_p)}{d_p + d_q} \quad \text{[Formula 4]}$$

In Formula 4, when 2 control grids closest to a pixel (i, j) are CGp and CGq, respectively, MVp and MVq indicate motion vectors of CGp and CGq, respectively. And, dp and dq may mean Euclid distance between CGp and CGq in the pixel (i, j). Referring to the example shown in FIG. 15, the two control grids closest to a current pixel (i, j) include CG3 and CG4, respectively. And, Formula 4 may be applied to the Euclid distances d3 and d4 to CG3 and CG4 from the pixel (i, j).

According to other embodiments, it may be able to find motion vector values of pixels in a block by performing linear interpolation on a motion vector value of a control grid of neighbor blocks by a subblock unit of a predetermined size. In this case, a block size may include one of 2×2, 4×4, 8×8, 16×16 and the like, by which the embodiments may be non-limited.

The motion vector predicting method using this linear interpolation may provide a picture having a smooth property with performance better than that of a case of using the same motion vector for a whole block. Hence, if a picture is smooth, linear interpolation may be used. In other cases, it may be able to promote operation and coding efficiency by using both of the linear interpolation and the method of applying the same motion vector to the whole block.

Generally, in a video signal coding process, a residual value for a predicted picture by predicting a motion is transmitted. Using the residual value only instead of a whole pixel value, it may be able to increase coding efficiency. According to some of embodiments of the present invention, a residual value is predicted for a residual value and a corresponding difference may be coded. In predicting the residual value, like the prediction in a previous pixel domain, motion vectors of neighbor pixels may be usable as a motion vector of a current pixel as well. In doing so, since an already-coded pixel is used within a current frame, it may be able to use pixel values of to and let side regions.

According to another embodiment, since correlation between adjacent cells in a residual picture is lower than that in an original picture, it may be able to use a scheme of giving a weight different in accordance with a distance from a current pixel.

Figure 16:
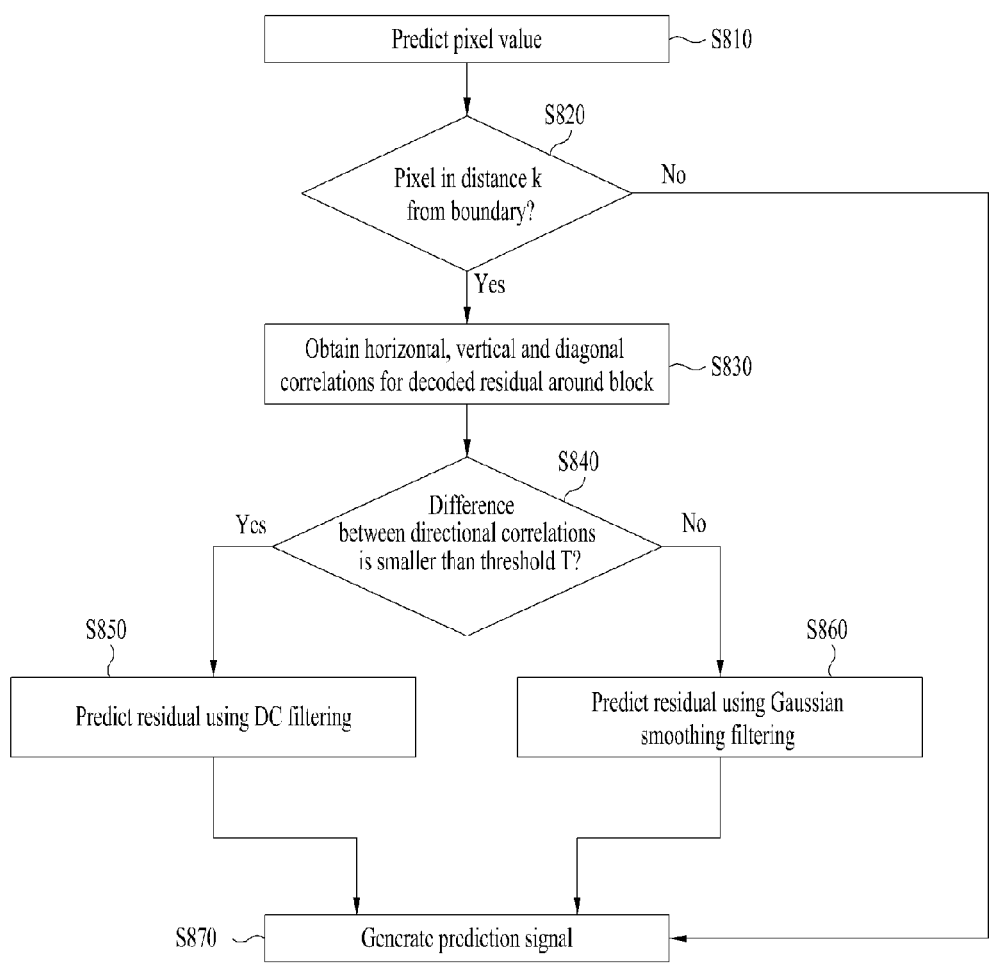
FIG. 16 is a flowchart of a prediction signal generating process including prediction in a residual domain.

FIG. 16 is a flowchart of a prediction signal generating process including prediction in a residual domain. First of all, after a pixel value prediction 5810 has been performed, it is determined whether to perform a residual prediction or not. For instance, as it gets more distant from a boundary of a block, correlation between pixel values becomes further reduced. Therefore, it may have better not perform the residual prediction on a pixel spaced apart from the block boundary over a predetermined space. Accordingly, only if a distance of a current pixel from a block boundary belongs to a range of a predetermined pixel value k, the residual prediction may be performed [S820]. In order to determine a filter direction, direction correlation for at least one of a horizontal direction, a vertical direction and a diagonal direction may be measured for a coded residual [S830]. A correlation difference for each of the measured directions may be compared to a specific threshold T [S840]. If the correlation difference is smaller than T, the residual prediction may be performed using DC filtering [S850]. Otherwise, a direction corresponding to a smallest value among the correlation values for the measured directions is selected and a residual prediction value may he then found using Gaussian smoothing filter in the selected direction [S860]. In the following description, a directional correlation measuring method may be explained with reference to FIGS. 17 to 19, a method of finding a residual prediction value may be explained with reference to FIG. 20. And, a DC filtering method may be explained with reference to FIG. 21.

Figure 17:
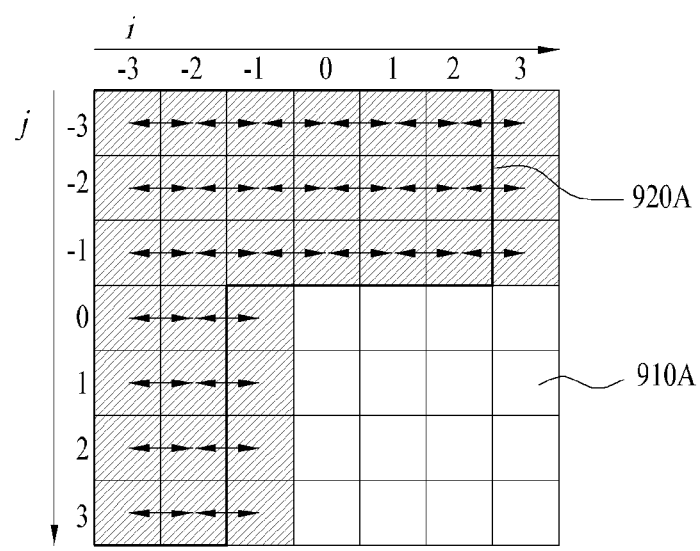
FIG. 17 is a diagram for a method of measuring horizontal correlation in a residual domain.

FIG. 17 is a diagram for a method of measuring a horizontal correlation. Referring to FIG. 17, a current block 910A is a region to which residual prediction is applied before coding. Top and left side regions of the current block 910A, i.e., a part represented as gray are already coded. An edge region adjacent to an outside of the current block among those regions by being spaced apart by partial pixels may be the region 920A to be used for a horizontal correlation measurement. A sum $SAD_h$ between adjacent pixels in horizontal direction may be found by Formula 5.

$$SAD_h \sum_{(i,j)\in\Psi_h} |R(i, j) - R(i+1, j)| \quad \text{[Formula 5]}$$

In Formula 5, $\Psi_h$ indicates a region to be used for a horizontal correlation measurement. For instance, in case of finding correlation for 3 neighbor pixels, as shown in FIG. 17, it may become $\Psi_h = \{(i,j)|(-3\leq i\leq 2, -3\leq j\leq -1)$ 또는 $(-3\leq i\leq -2, 0\leq j\leq 3)\}$. In this case, R (i, j) indicates a residual value at the pixel (i, j).

Figure 18:
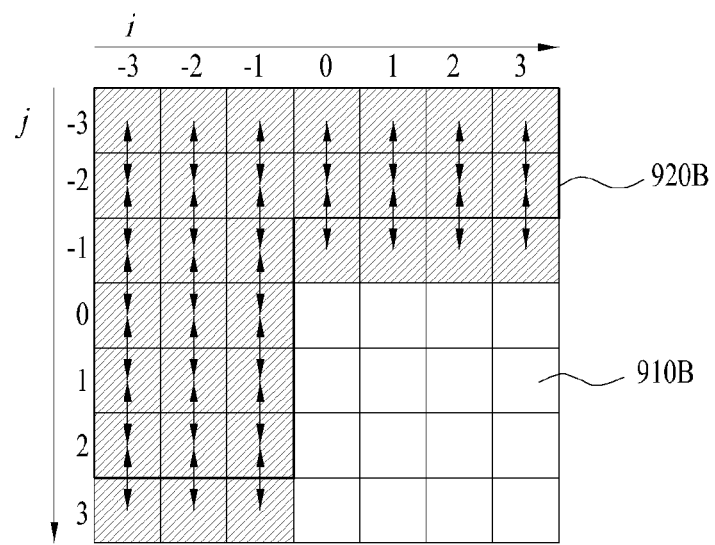
FIG. 18 is a diagram for a method of measuring vertical correlation in a residual domain.
Figure 19:
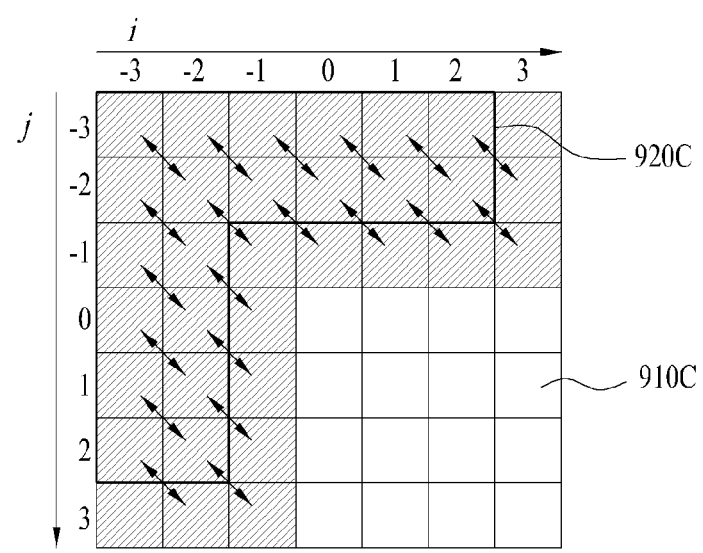
FIG. 19 is a diagram for a method of measuring diagonal correlation in a residual domain.

Similarly, FIG. 18 shows a method of measuring a correlation in a vertical direction. In this case, a measurement value $SAD_V$ may be represented as FIG. 6. Similarly, FIG. 19 shows a method of measuring a correlation in a diagonal direction. In this case, a measurement value $SAD_d$ may be represented as FIG. 7.

$$SAD_v = \sum_{(i,j)\in \Psi_v} |R(i, j) - R(i, j+1)| \qquad [\text{FIG. 6}]$$

$$SAD_d = \sum_{(i,j)\in \Psi_d} |R(i, j) - R(i+1, j+1)| \qquad [\text{FIG. 7}]$$

In Formula 6 and Formula 7, $\Psi_v$ and $\Psi_d$ indicate regions to be used for the vertical correlation measurement and the diagonal correlation measurement, respectively. For instance, if correlations are found for 3 neighbor pixels, as shown in FIG. 18 and FIG. 19, it may become '$\Psi_v=\{(i, y)|(-3\le i\le 3, -3\le j\le -2)$ or $(-3\le i\le -1, -1\le j\le 2)\}$' and

'$\Psi_d=\{(i, y)|(-3\le i\le 2, -3\le j\le -2)$ or $(-3\le i\le -2, -1\le j\le 2)\}$'.

After SAD value has been found for each direction, filtering for residual prediction may be performed for the direction having the biggest correlation.

Figure 20:
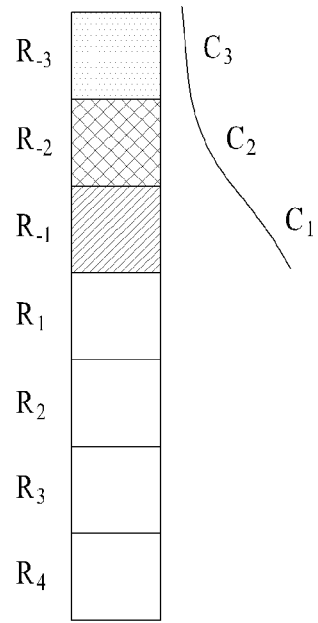
FIG. 20 is a diagram of a pixel for performing residual prediction and neighbor pixels used for residual prediction.

FIG. 20 shows a pixel for performing residual prediction and neighbor pixels used for the residual prediction. When a pixel boundary value k for applying residual prediction is equal to 3, FIG. 20 shows one embodiment of a case that a vertical filtering is selected. Referring to FIG. 20, values of residuals $R_1$, $R_2$ and $R_3$ in a current block may be found using already-coded adjacent residual blocks $R_{-1}$, $R_{-2}$ and $R_{-3}$, as shown in Formula 8.

$R_1 = +c_1R_{-1}+c_2R_{-2}+c_3R_{-3}$ $R_2 = c_2R_{-1}+c_3R_{-2}$ $R_3 = c_3R_{-1}$ [Formula 8]

In this case, a used filter coefficient is set to change a reflected rate per pixel in accordance with a distance from a neighbor residual, i.e., to decrease a weight for a corresponding pixel in inverse proportion to the distance. Since the inter-residual correlation is deceased in inverse proportion to the distance, strength of prediction may be lowered. Hence, it may be able to such a filter of a type as Gaussian smoothing filter, Laplacian filter and the like. In case of using Gaussian smoothing filter, a filter coefficient may be represented as Formula 9.

$$c(i) = \frac{1}{\alpha\sqrt{2\pi\sigma^2}} \exp\left(-\frac{(i-1)^2}{2\sigma^2}\right) \cdot 1 \le i \le 3 \qquad [\text{Formula 9}]$$

Figure 21:
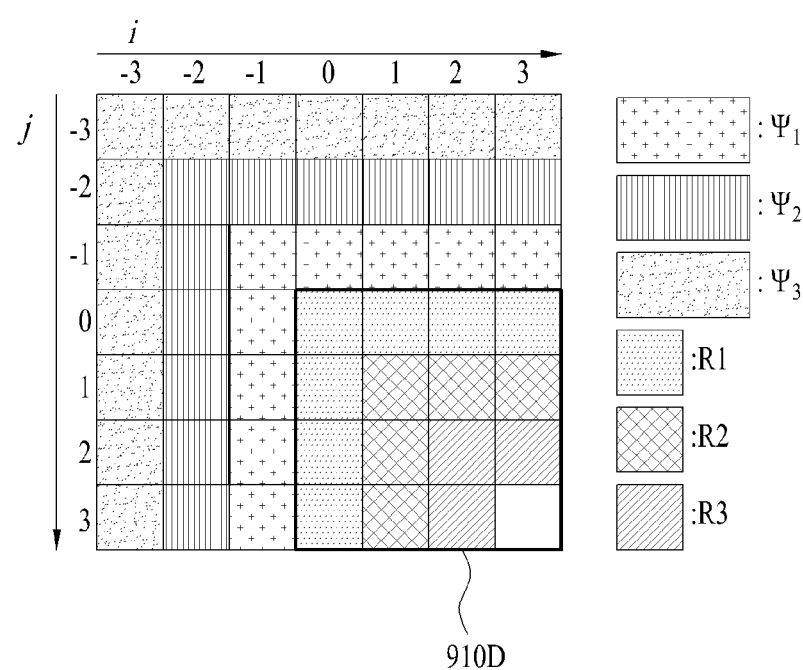
FIG. 21 is a diagram of a region for performing DC filtering for residual prediction.

If a difference between the values $SAD_h$, $SAD_v$ and $SAD_d$ calculated for the respective directions is 0 or small, e.g., if a difference is smaller than a specific threshold T, DC filtering is performed. FIG. 21 is a diagram of a region for performing DC filtering for residual prediction. For a region 910D for performing a residual prediction, assuming that average values of residual pixel values in regions $\Psi_1$, $\Psi_2$ and $\Psi_3$ on the already-coded left and top sides are set to $DC_1$, $DC_2$ and $DC_3$, respectively, the residuals of the regions $R_1$, $R_2$ and $R_3$ may be represented as Formula 10.

$R_1 = c_1DC_1+c_2DC_2+c_3DC_3$ $R_2 = c_2DC_1+c_3DC_2$ $R_3 = c_3DC_1$ [Formula 10]

According to one embodiment of the present invention, an encoder apparatus predicts a residual value by the above-mentioned method, codes by a corresponding difference value only, and then transmits the coded value. Thereafter, a decoder apparatus may be able to find a residual prediction value using the same method. Optionally, according to another embodiment, an encoder apparatus transmits an index of a residual prediction value itself and a decoder apparatus may be then able to use the index as it is.

In video signal processing, if coding is performed by block unit, distortion may occur on a block boundary. This block-distorted frame is saved in a frame storing unit. If the stored frame is used for a next prediction as it is, image quality degradation may propagate. Hence, a filter operation is performed to reduce the block distortion prior to storing a decoded frame. This filter may be called a deblocking filter.

According to some of the embodiments, a filter operation may be adaptively performed in a manner of differentiating a filter applying strength in accordance with a position within the same picture. In particular, a strong filter operation is used for a position vulnerable to block distortion and a weak filter operation is used for a part free from block distortion. Hence, it may be able to prevent distortion from being caused by a filter operation on an edge of the part free from the block distortion. In order to perform an adaptive filter operation, block strength may be defined as Table 1.

TABLE 1

| Boundary strength (BS) | |
|---|---|
| 4 | At least one side of an adjacent block belongs to an intra-picture coded block and is located on a block boundary. |
| 3 | At least one side of an adjacent block belongs to an intra-picture coded block and is not located on a block boundary. |
| 2 | All adjacent block is not intra-picture coded block. A prescribed side has orthogonal transform coefficient. |
| 1 | All adjacent block is not intra-picture coded block and does not have orthogonal transform coefficient. A reference frame, the number of reference frames and a motion vector value are different. |
| 0 | All adjacent block is not intra-picture coded block and does not have orthogonal transform coefficient. A reference frame and a motion vector value are equal. |

Figure 22:
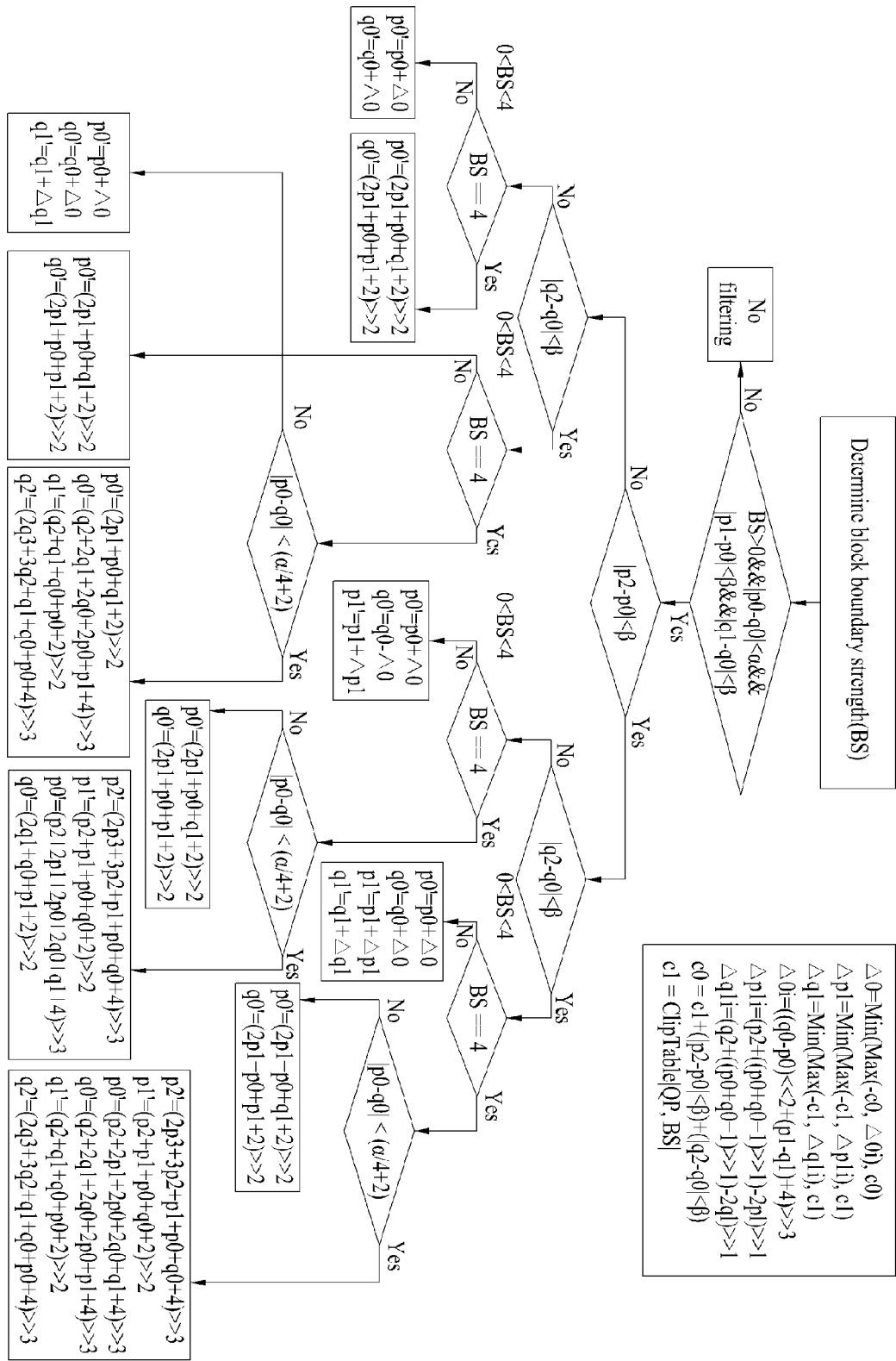
FIG. 22 is a diagram for a deblocking filtering method in accordance with a block boundary strength value according to one embodiment.

If a number of a boundary strength becomes bigger, a stronger filter may be applied. In case of 0, filtering may not be applied. FIG. 22 shows a filtering method in accordance with a block boundary strength value according to one embodiment. On each edge, whether to perform a filtering may be determined in consideration of a pixel value on the edge using values $\alpha$ and $\beta$ determined in accordance with quantization parameter. And, the boundary strength determining method may be non-limited by this embodiment.

Figure 23:
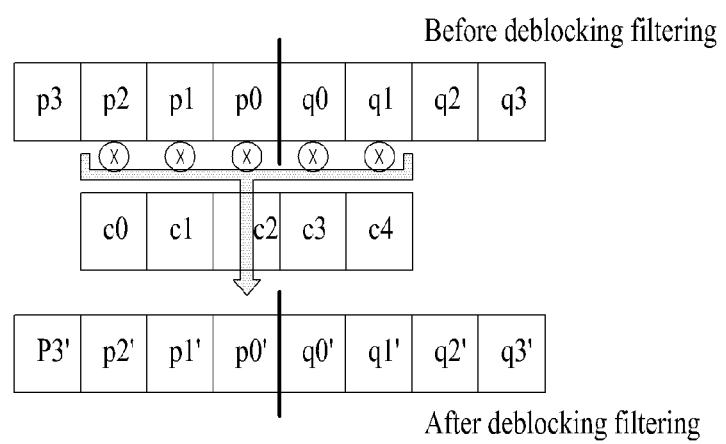
FIG. 23 is a diagram of a portion of a deblocking filtering applied edge to describe a deblocking filtering process.

According to another embodiment, filtering may not be performed using a filter coefficient fixed to all picture. Optionally, filtering may be performed using an adaptive filtering coefficient suitable for property of a picture. This filtering coefficient may mean the coefficients for an edge to be deblocked to enable a picture, which is obtained by filtering a reconstructed picture, to be closest to an original picture. This coefficient may be obtained each picture or slice. FIG. 23 shows a filtering process by pixel unit. In particular, 'p0 to p3' and 'q0 to q3' indicate pixels, to which deblocking filtering will be applied, belonging to different block regions. By multiplying the pixels filter coefficients c0 to c4, respectively, pixels p0' to p3' and pixels q0' to q3' may be generated. On the edge to be deblocked, assuming that $c_j$ indicates a coefficient to be added to each pixel by multiplication and that $y_i$ indicates a reconstructed pixel, a filtered pixel $z_k$ may be found by Formula 11. Assuming that $x_k$ indicates an original pixel, a filtering coefficient may become a set of values that minimize a difference between $z_k$ and $x_k$, as shown in Formula 12. Hence, the adaptive filter coefficient $c_j$ may be found by Formula 13.

$$z_k = \sum_{i \in Tap} y_i \cdot c_i \qquad \text{[Formula 11]}$$

$$\text{error}_k = z_k - x_k \qquad \text{[Formula 12]}$$

$$c_i = \arg\min E[\text{error}_k^2] \qquad \text{[Formula 13]}$$

$$\frac{\partial}{\partial c_i} E[\text{error}_k^2] = 2\left(\sum_{j \in Tap} E\{(y_i)(y_j)\}c_j\right) - 2E[(y_i)(x_k)]$$

$$= 0$$

A decoder may be able to receive these coefficients from a received video signal. FIG. 24 is a syntax related to a $1^{st}$ embodiment for enabling adaptive filter coefficients to be usable for deblocking filtering. Referring to FIG. 24, a flag (iadf_flag) indicating whether to perform a filtering using a filter coefficient adaptively determined for a slice, a $2^{nd}$ flag (iadf_applied[ ]) indicating whether to obtain a filter coefficient adaptively determined for a slice each boundary strength, and a filter coefficient (filter_coef[ ][ ]) for each applied boundary strength may be obtained from a video signal per slice.

Figure 25:
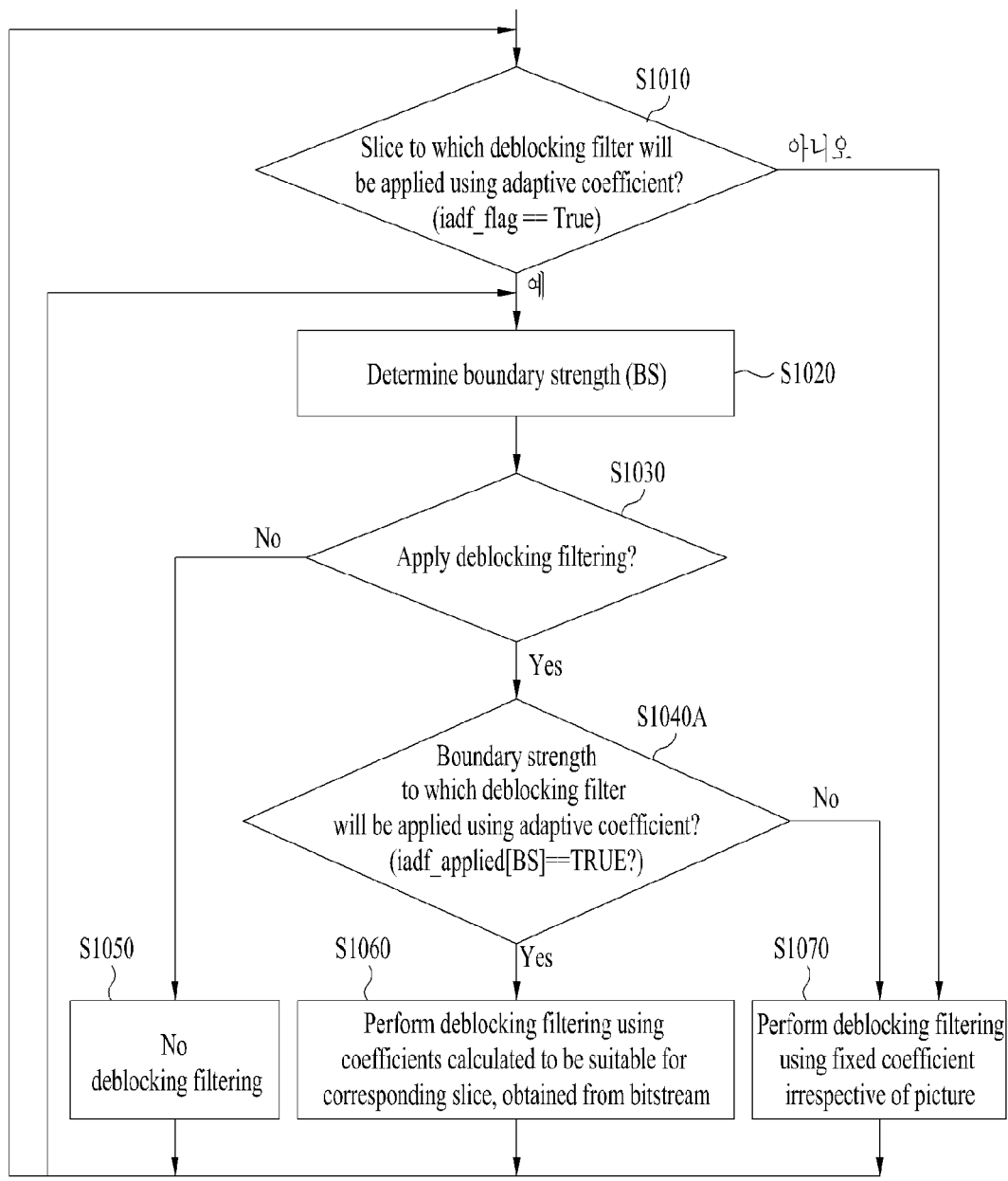
FIG. 25 is a flowchart of a deblocking filter applying method according to FIG. 24.

FIG. 25 is a flowchart of a deblocking filter applying method according to FIG. 24. For each slide, it is chanced whether the corresponding slice is the slice that uses an adaptive coefficient [S1010]. After a boundary strength of each block has been determined [S1020], a block boundary strength condition may be checked [S1030]. If the strength is weak, it may not perform deblocking filtering [S1050]. Otherwise, a flag indicating whether to apply an adaptive coefficient is checked [S1040A]. And, the deblocking filtering may be then applied using an adaptive coefficient suitable for the corresponding slice [S1060]. In case that the adaptive filter coefficient is not used, a filtering operation is performed using a coefficient equally fixed to all picture [S1070].

FIG. 26 is a syntax related to a $2^{nd}$ embodiment for enabling adaptive filter coefficients to be usable for deblocking filtering. Referring to FIG. 26, a $1^{st}$ flag (iadf_flag) indicating whether to perform a filtering using a filter coefficient adaptively determined for a slice, a threshold information (limited_bs_number) indicating a range of a block boundary strength from which a filter coefficient adaptively determined for the slice is obtained, and a filter coefficient (filter_coef[ ][ ]) for an applied boundary strength may be obtained from a video signal per slice. In this case, according to the meaning of the threshold information, a deblocking filtering may be performed on a position having a boundary strength (BS) equal to or greater than a limit of a designated boundary strength using an adaptive coefficient. Otherwise, a filtering operation is performed using a coefficient equally fixed to all picture.

Figure 27:
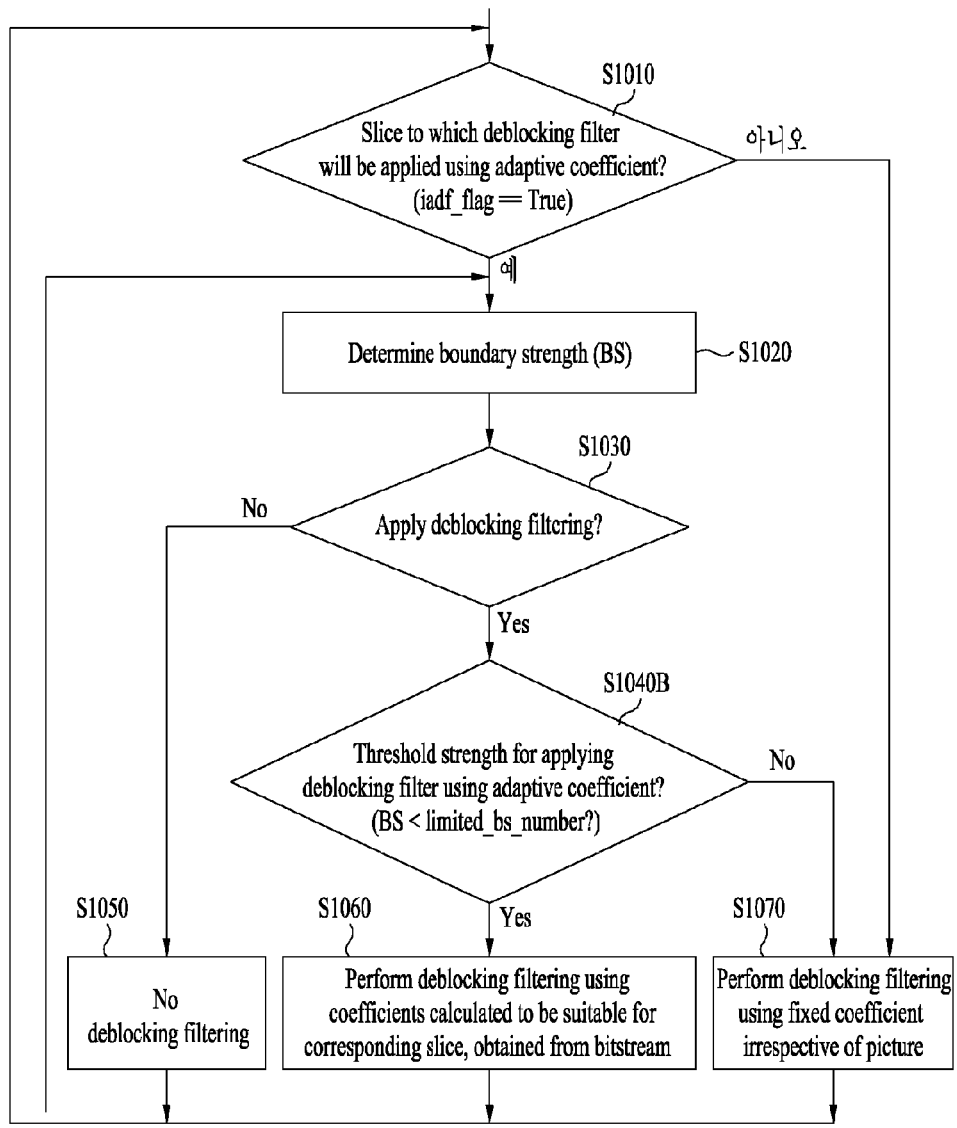
FIG. 27 is a flowchart of a deblocking filter applying method according to FIG. 26.

FIG. 27 is a flowchart of a deblocking filter applying method according to FIG. 26. The process shown in FIG. 27 may be similar to the former description with reference to FIG. 26. Yet, whether to apply a corresponding adaptive coefficient may be checked by comparing [S1040B] whether it is equal to or greater than a threshold strength instead of checking a flag indicating a boundary strength.

Figure 28:
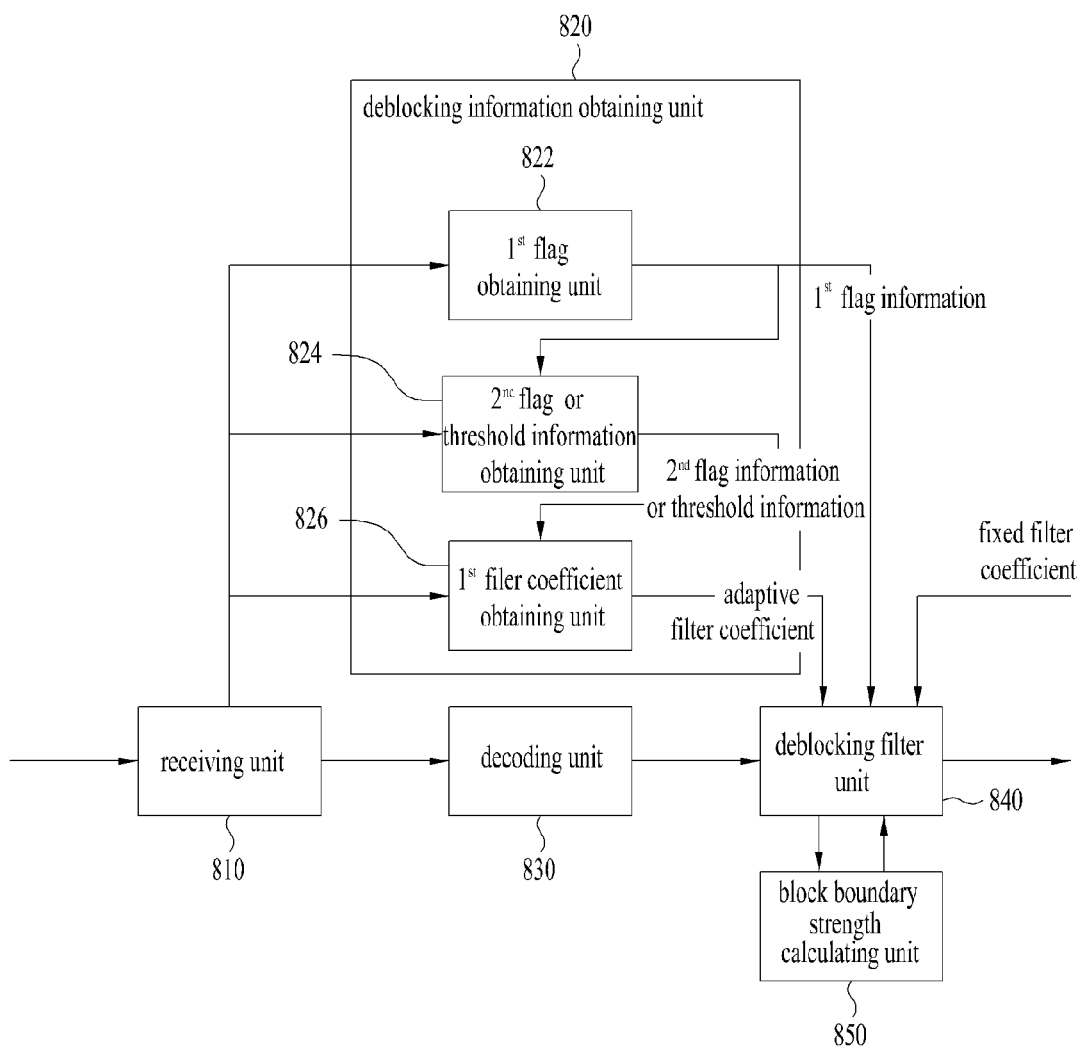
FIG. 28 is a block diagram for one example of a video signal processing apparatus according to an embodiment of the present invention.

FIG. 28 is a block diagram for one example of a video signal processing apparatus according to an embodiment of the present invention. Referring to FIG. 28, a video signal processing apparatus may include a receiving unit 810, a deblocking information obtaining unit 820, a decoding unit 830 and a deblocking filter unit 840. The receiving unit 810 receives a bitstream including a video signal. The video signal bitstream is delivered to the deblocking information obtaining unit 820 and the decoding unit 830. According to some of embodiments of the present invention, a block boundary strength calculating unit 850 may be further included. In this case, the block boundary strength calculating unit 850 may calculate a block boundary strength based on a pixel position, to which deblocking filtering will be applied, a block type and the like.

The deblocking information obtaining unit 820 may include a $1^{st}$ flag obtaining unit 822, a $2^{nd}$ flag or threshold information obtaining unit 824 and an adaptive filter coefficient obtaining unit 826. The $1^{st}$ flag obtaining unit 822 obtains a flag indicating whether to use an adaptive coefficient for all slices. Only if the $1^{st}$ flag indicates that the adaptive filter coefficient is used, the $2^{nd}$ flag or threshold information obtaining unit 824 obtains a flag indicating whether to apply an adaptive coefficient at a prescribed block boundary strength or the threshold information specifying whether to apply the adaptive filter coefficient over the prescribed block boundary strength. The adaptive filter coefficient obtaining unit 826 obtains a filter coefficient from a video signal received for the block boundary strength, at which the $2^{nd}$ flag indicates to use the adaptive filter coefficient, or the block boundary strength smaller than the threshold strength and then delivers the obtained filter coefficient to the deblocking filter unit 840.

Meanwhile, the decoding unit 830 decodes the delivered picture. The reconstructed picture is delivered to the deblocking filter unit 840 to apply a deblocking filtering operation thereto. In applying the deblocking filtering, the filtering may be performed by determining whether to use the adaptive filter coefficient or the fixed filter coefficient in accordance with the flag information obtained by the deblocking information obtaining unit 820.

According to an embodiment of the present invention, it may be described that an adaptive filter coefficient is calculated per slice, by which the present invention may be non-limited. This may be applicable to such a different unit as a sequence, a picture, a macroblock and the like.

According to embodiments of the present invention, it may be able to apply an adaptive loop filtering to a reconstructed picture to eliminate noise from all picture. According to implementation, Wiener filter coefficient is obtained between an original frame and a reconstructed frame and is then coded to use. Yet, if the adaptive loop filter 134 is applied to a signal after the application of the deblocking filter 132, as shown in FIG. 1, since deblocking distortion is contained in the deblocking-filtered signal as well as quantization distortion, it may be difficult to reconstruct two different kinds of distortions using a single filter. Therefore, it may be necessary to perform distortion correction prior to the deblocking filter.

Figure 29:
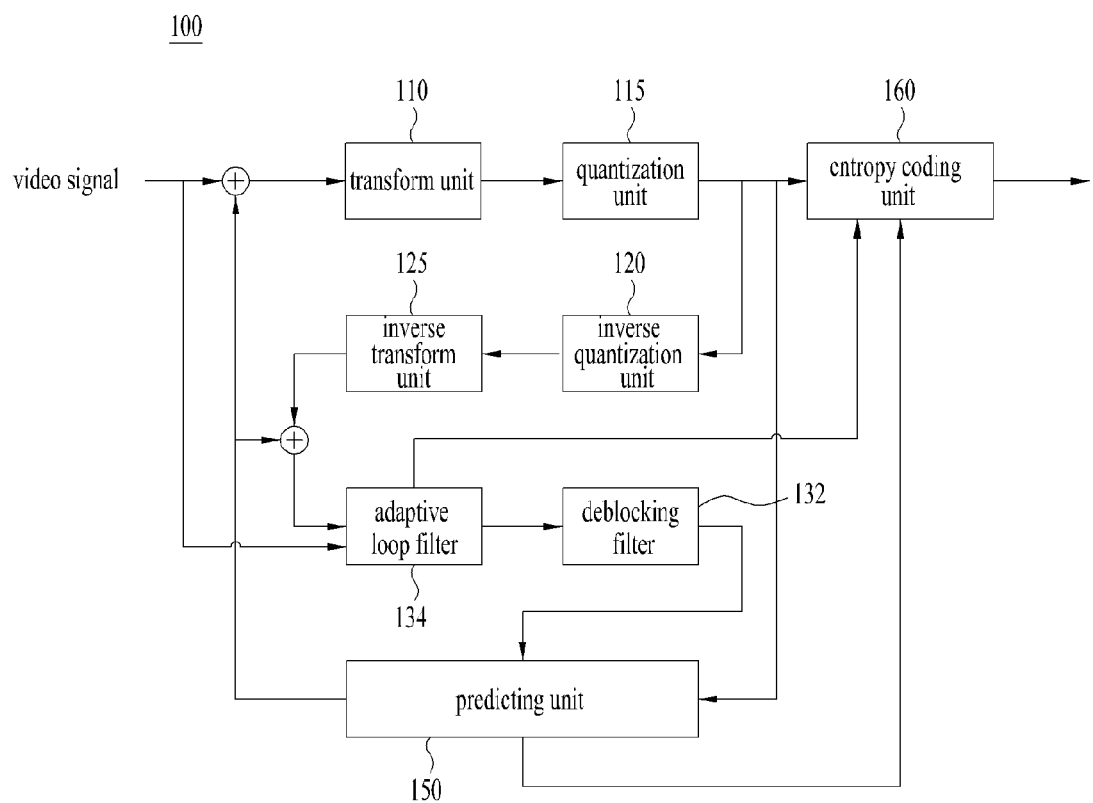
FIG. 29 is a block diagram of an encoder according to a $1^{st}$ embodiment of the present invention for improvement of an adaptive loop filter.
Figure 30:
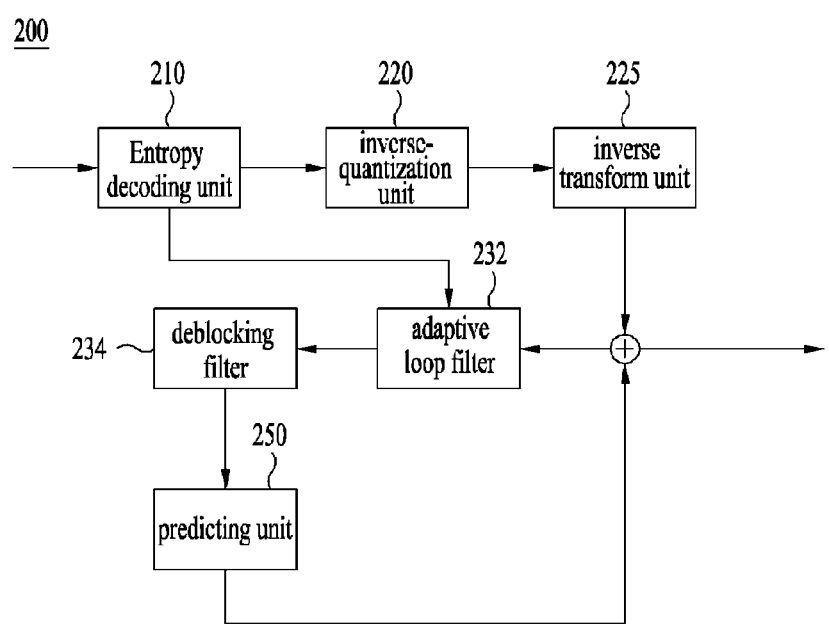
FIG. 30 is a block diagram of a decoder according to a $1^{st}$ embodiment of the present invention for improvement of an adaptive loop filter.
Figure 31:
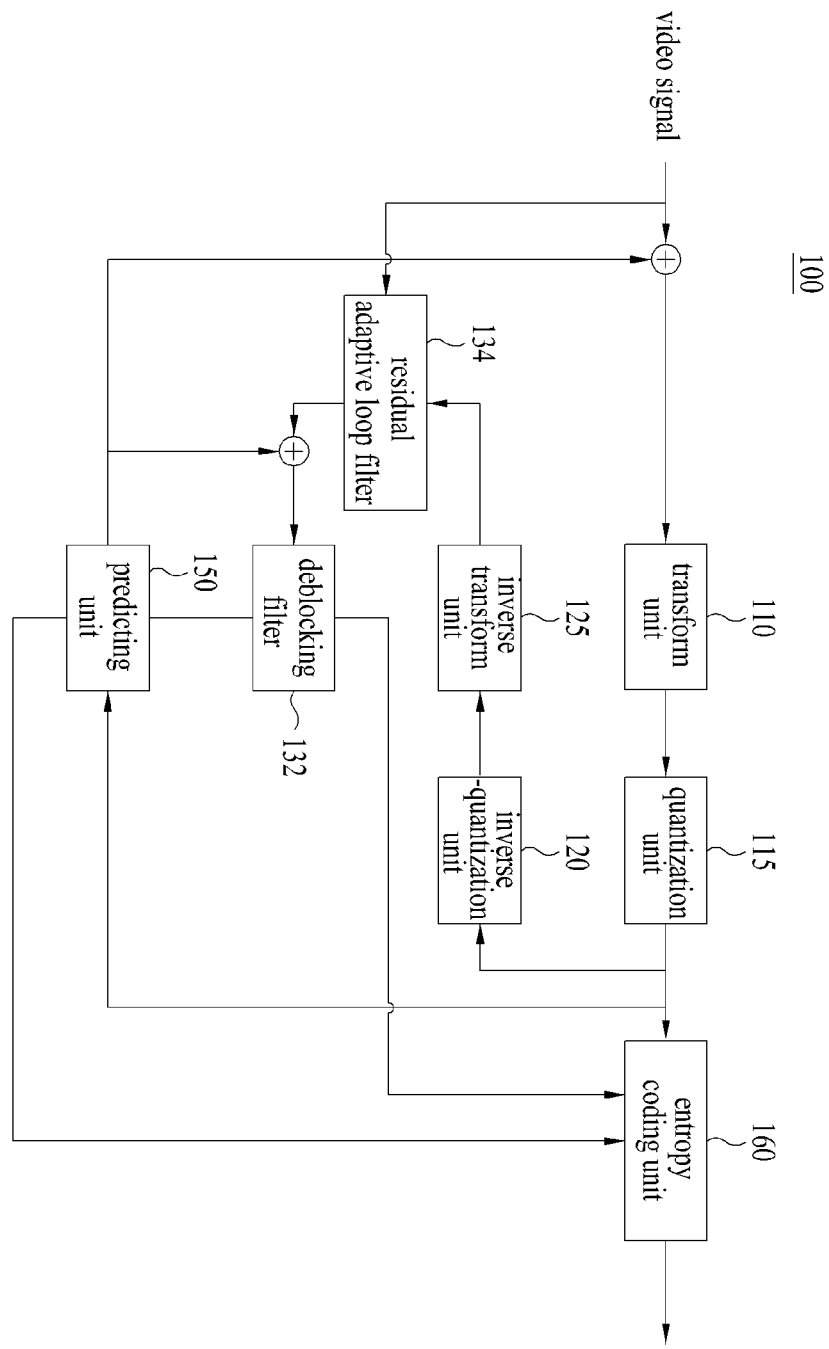
FIG. 31 is a block diagram of an encoder according to a $2^{nd}$ embodiment of the present invention for improvement of an adaptive loop filter.
Figure 32:
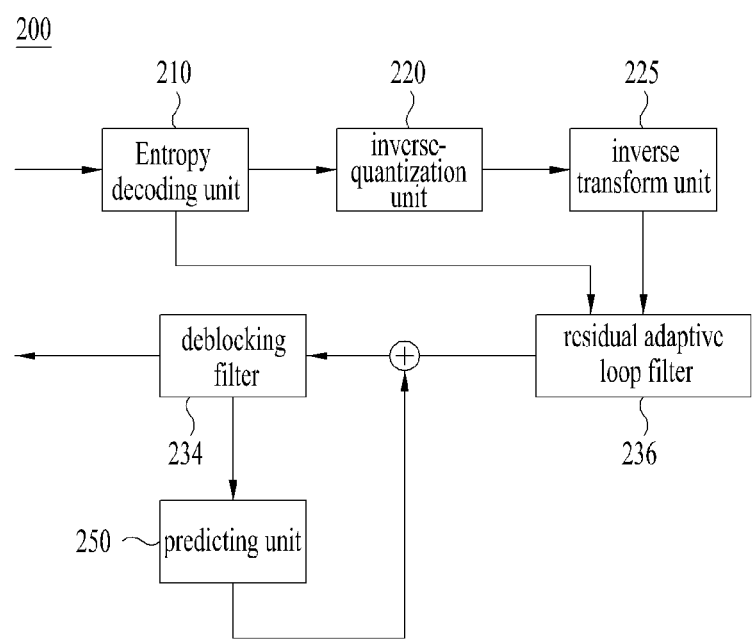
FIG. 32 is a block diagram of a decoder according to a $2^{nd}$ embodiment of the present invention for improvement of an adaptive loop filter.

FIG. 29 is a block diagram of an encoder according to a $1^{st}$ embodiment of the present invention for improvement of an adaptive loop filter. Referring to FIG. 29, Weiner filter coefficient between an original picture and a reconstructed picture prior to the deblocking filtering may be obtained by performing an adaptive filter 134 on a reconstructed picture prior to a deblocking filter 132. FIG. 30 is a block diagram of a decoder 200 according to one embodiment of the present invention. Likewise, an adaptive loop filter may be performed prior to a deblocking filter 234.

Meanwhile, it may be more effect to perform distortion correction on a residual picture, from which picture-unique property is removed, rather than a picture reconstructed by adding a predicted picture and a residual value together. Therefore, according to another embodiment of the present invention, an adaptive loop filter 134 is preferentially applied to a residual signal only, referring to an encoder 100 shown in FIG. 31 or a decoder 200 shown in FIG. 32. An original residual is a difference between an original picture and a prediction signal used for coding. And, a reconstructed residual is a difference between a reconstructed picture prior to deblocking and a prediction signal used for coding. Hence, if a difference between a reconstructed residual and an original residual gets smaller, a reconstructed picture may further become identical to an original picture.

Figure 33:
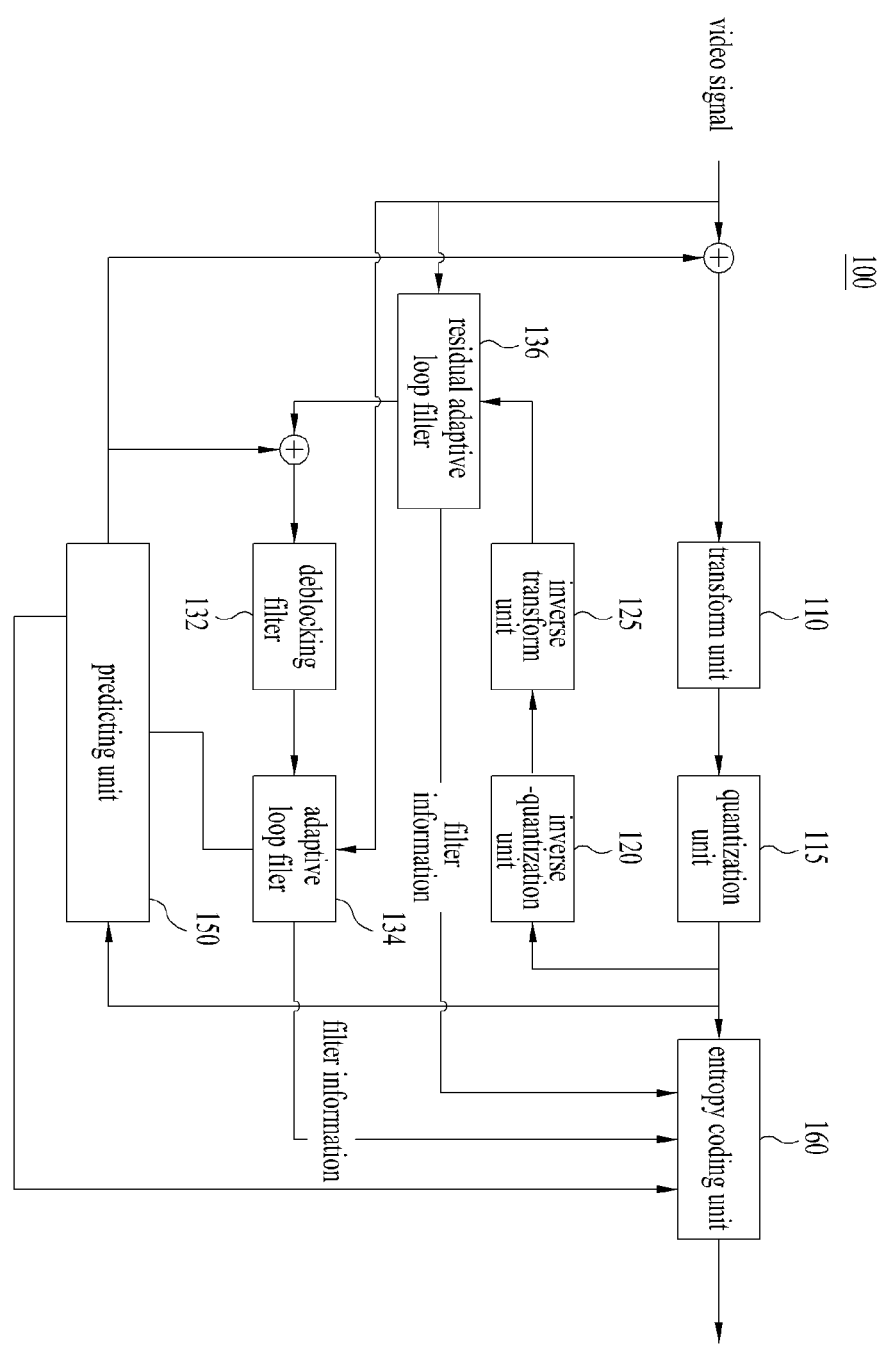
FIG. 33 is a block diagram of an encoder according to a $3^{rd}$ embodiment of the present invention for improvement of an adaptive loop filter.
Figure 34:
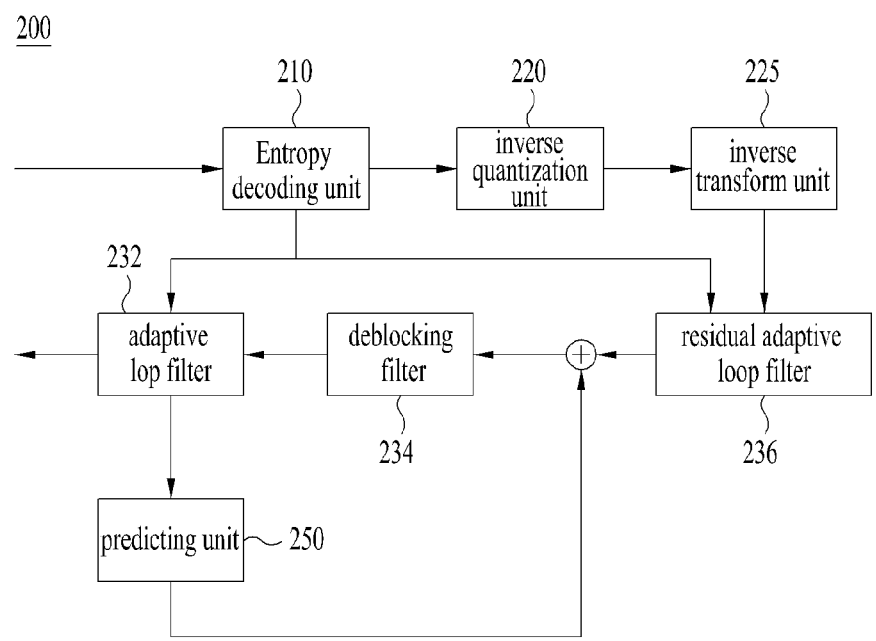
FIG. 34 is a block diagram of a decoder according to a $3^{rd}$ embodiment of the present invention for improvement of an adaptive loop filter.

According to another embodiment of the present invention, referring to an encoder 100 shown in FIG. 33 or a decoder 200 shown in FIG. 34, it may be able to apply an adaptive loop filter for a residual and an adaptive loop filter for a previously-deblocked reconstructed picture in parallel.

Figure 35:
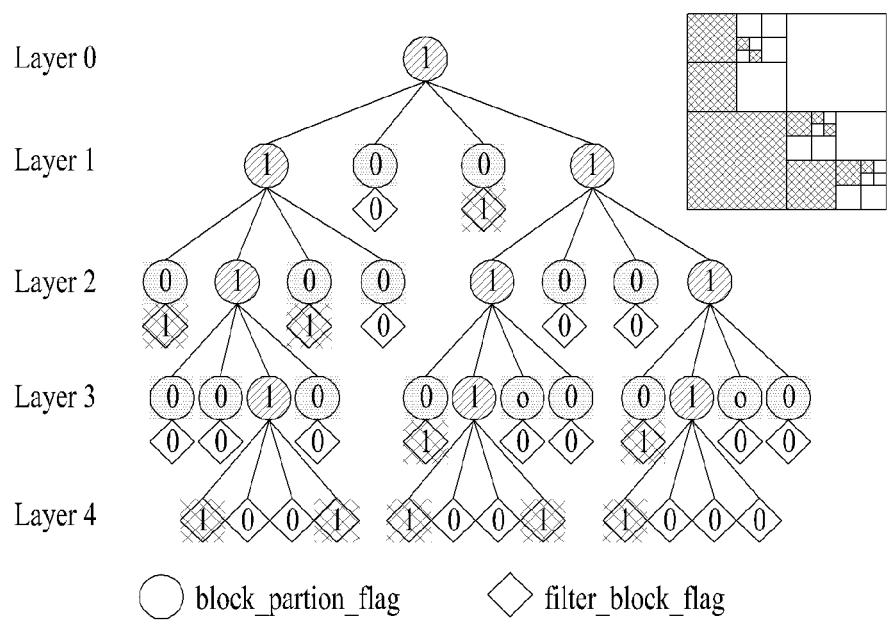
FIG. 35 is a diagram of a quadtree for application of an adaptive lop filter.

In applying an adaptive loop filter to all picture, an adaptive loop filter is applied based on filter application information extracted from a video signal. The filter application information may indicate whether an adaptive loop filter is adaptively applied to each block in the current frame or the adaptive loop filter is applied to all blocks in the current frame. And, when an adaptive loop filter is adaptively applied to each block in the current frame, it may be able to differentiate whether to apply the adaptive loop filter by block unit. According to some of embodiments, in order to indicate whether to apply a filter to which block, it may be able to use such a quadtree as shown in FIG. 35. A picture may keep being partitioned into sub-blocks within a block. A flag (block_partition_flag) indicating whether to keep partitioning a block corresponding to an inner node of a quad-tree into sub-blocks may be used. For instance, if an inner node value is set to 1, a block corresponding to a node may be partitioned into 4 blocks. If the inner node value is set to 0, the corresponding block may stop being partitioned and a filter operation may be then executed.

It is not necessary for a block to be partitioned in to 4 regular directional blocks only. For instance, if an inner node value is set to 1, a corresponding block may be partitioned into 2 horizontal rectangular subblocks. For instance, if an inner node value is set to 2, a corresponding block may be partitioned into 2 vertical rectangular subblocks. For instance, if an inner node value is set to 3, a corresponding block may be partitioned into 4 squared subblocks.

Since an inner node having a value not set to 0 partitions a block, it may have at least 2 child nodes. Since a node having a value set to 0 does not partition a block any further, it may has one child. In this case, the child may become a leaf node. In the leaf node, a flag (filter_block_flag) indicating whether to apply an adaptive loop filter to a corresponding block is stored. For instance, if an inner node value is set to 1, an adaptive loop filter is applied to a block corresponding to the node. For instance, if an inner node value is set to 0, an adaptive loop filter is not applied to a block corresponding to the node.

A decoding/encoding method according to the present invention can be implemented into a computer-executable program and can be stored in a computer-readable recording medium. And, multimedia data having a data structure of the present invention can be stored in the computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the above mentioned encoding method can be stored in the computer-readable recording medium or can be transmitted via wire/wireless communication network.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to video encoding/decoding.

What is claimed is:

1. A method for decoding a video signal by a video decoding apparatus, comprising:
receiving the video signal;
obtaining a motion vector of a current block from the video signal, the current block being included in a current frame;
obtaining a prediction value of the current block using the motion vector of the current block;
reconstructing the current frame using the prediction value of the current block and residual data of the current block;
applying a deblocking filter to the reconstructed current frame based on a boundary strength;
obtaining a filter coefficient of an adaptive loop filter and filter application information from the video signal when the adaptive loop filter is applied to the deblocking filtered current frame, the filter application information indicating whether the adaptive loop filter is adaptively applied to each block in the current frame or the adaptive loop filter is applied to all blocks in the current frame;
obtaining block partition information for the current block when the filter application information indicates the adaptive loop filter is adaptively applied to each block in the current frame;
obtaining filter block information for a sub-block in the current block, the filter block information indicating whether the adaptive loop filter is applied to the sub-block, and the current block including at least one sub-block based on the block partition information; and
applying the filter coefficient of the adaptive loop filter to the sub-block in the deblocking filtered current frame when the filter block information indicates the adaptive loop filter is applied to the sub-block.

2. The method of claim 1, wherein the obtaining the motion vector comprises:
obtaining a motion vector index for the current block and a motion vector difference for the current block from the video signal;
obtaining a motion vector predictor of the current block corresponding to the motion vector index from a motion vector predictor candidate; and
obtaining the motion vector of the current block using the motion vector predictor and the motion vector difference, wherein the motion vector predictor candidate includes at least one of a motion vector of a spatial neighboring block and a motion vector of a temporal neighboring block.

3. The method of claim 2, wherein the spatial neighboring block includes at least one of left, top and right top blocks of the current block.

4. The method of claim 2, wherein the temporal neighboring block is in a reference frame of the current frame.

5. The method of claim 4, wherein the temporal neighboring block is in a same location as the current block.

6. An apparatus for decoding a video signal, comprising:
receiving unit receiving the video signal;
inter-prediction unit obtaining a motion vector of a current block from the video signal, the current block being included in a current frame, obtaining a prediction value of the current block using the motion vector of the current block;
reconstructing unit reconstructing the current frame using the prediction value of the current block and residual data of the current block; and
filtering unit obtaining a filter coefficient of an adaptive loop filter and filter application information from the video signal when the adaptive loop filter is applied to a deblocking filtered current frame, obtaining block partition information for the current block when the filter application information indicates the adaptive loop filter is adaptively applied to each block in the current frame, obtaining filter block information for a sub-block in the current block, and applying the filter coefficient of the adaptive loop filter to the sub-block in the deblocking filtered current frame when the filter block information indicates the adaptive loop filter is applied to the sub-block,
wherein the filter application information indicates whether the adaptive loop filter is adaptively applied to each block in the current frame or the adaptive loop filter is applied to all blocks in the current frame, the filter block information indicates whether the adaptive loop filter is applied to the sub-block, and the current block includes at least one sub-block based on the block partition information.

7. The apparatus of claim 6, wherein the inter-prediction unit comprises:
motion vector predictor determining unit obtaining a motion vector index for the current block and a motion vector difference for the current block from the video signal, and obtaining a motion vector predictor of the current block corresponding to the motion vector index from a motion vector predictor candidate; and
motion vector generating unit obtaining the motion vector of the current block using the motion vector predictor and the motion vector difference,
wherein the motion vector predictor candidate includes at least one of a motion vector of a spatial neighboring block and a motion vector of a temporal neighboring block.

8. The apparatus of claim 7, wherein the spatial neighboring block includes at least one of left, top and right top blocks of the current block.

9. The apparatus of claim 7, wherein the temporal neighboring block is in a reference frame of the current frame.

10. The apparatus of claim 9, wherein the temporal neighboring block is in a same location as the current block.

* * * * *